(12) United States Patent
Yuan et al.

(10) Patent No.: US 10,651,887 B2
(45) Date of Patent: May 12, 2020

(54) MULTIUSER COMMUNICATION METHODS AND DEVICES FOR CODE DIVISION MULTIPLE ACCESS (CDMA)

(71) Applicant: ZTE Corporation, Shenzhen (CN)

(72) Inventors: Zhifeng Yuan, Shenzhen (CN); Weimin Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 67 days.

(21) Appl. No.: 15/521,096

(22) PCT Filed: Jul. 7, 2015

(86) PCT No.: PCT/CN2015/083479
§ 371 (c)(1),
(2) Date: Apr. 21, 2017

(87) PCT Pub. No.: WO2016/062120
PCT Pub. Date: Apr. 28, 2016

(65) Prior Publication Data
US 2017/0353213 A1    Dec. 7, 2017

(30) Foreign Application Priority Data
Oct. 21, 2014    (CN) .......................... 2014 1 0564307

(51) Int. Cl.
*H04B 1/707*    (2011.01)
*H04L 27/26*    (2006.01)
(Continued)

(52) U.S. Cl.
CPC ........... *H04B 1/707* (2013.01); *H04B 7/2628* (2013.01); *H04J 13/10* (2013.01); *H04J 13/107* (2013.01); *H04L 27/26* (2013.01)

(58) Field of Classification Search
CPC ........ H04B 1/69; H04B 1/707; H04B 1/7103; H04B 7/06; H04B 7/26; H04B 7/216;
(Continued)

(56) References Cited

U.S. PATENT DOCUMENTS

| 6,233,271 B1 * | 5/2001 | Jones ..................... H04B 1/707 375/142 |
| 2014/0056332 A1 * | 2/2014 | Soualle ................ H04B 1/7103 375/146 |
| 2014/0098782 A1 | 4/2014 | Shirazi et al. |

FOREIGN PATENT DOCUMENTS

| CN | 101043725 A | 9/2007 |
| CN | 101366205 A | 2/2009 |

(Continued)

OTHER PUBLICATIONS

International Search Report for corresponding application No. PCT/CN2015/083479 filed on Jul. 7, 2015; dated Sep. 21, 2015.
(Continued)

*Primary Examiner* — Shawkat M Ali
(74) *Attorney, Agent, or Firm* — Cantor Colburn LLP

(57) ABSTRACT

Provided are multiuser communication methods and devices for Code Division Multiple Access (CDMA). N modulated symbols which are obtained by modulating a code block coded by a channel coder are acquired, where N is a positive integer more than or equal to 2. The N modulated symbols are spread according to N spread sequences with a specified length, and there may be at least two different spread sequences in the N spread sequences with the specified length. The spread modulated symbols are transmitted.

21 Claims, 9 Drawing Sheets

(51) Int. Cl.
*H04J 13/10* (2011.01)
*H04B 7/26* (2006.01)

(58) Field of Classification Search
CPC ....... H04B 7/2628; H04B 15/00; H04J 11/00;
H04J 13/10; H04J 13/107; H04L 1/00;
H04L 1/02; H04L 27/26; H04L 27/32
USPC ............... 370/203, 209, 320, 335, 342, 436;
375/130, 141, 142, 146, 148, 150, 267
See application file for complete search history.

(56) References Cited

FOREIGN PATENT DOCUMENTS

| | | | |
|---|---|---|---|
| CN | 103634065 | A | 3/2014 |
| JP | 8335891 | A | 12/1996 |
| JP | 200667118 | A | 3/2006 |
| JP | 2008515268 | A | 5/2008 |
| JP | 2008537436 | A | 9/2008 |
| WO | 2005088862 | A1 | 9/2005 |
| WO | 2008031111 | A1 | 3/2008 |

OTHER PUBLICATIONS

EP Extended Search Report dated Oct. 30, 2017 re: Application No. PCT/CN2015/083479, pp. 1-8, citing: US 2014/056332 A1 and WO 2008/031111 A1.

\* cited by examiner

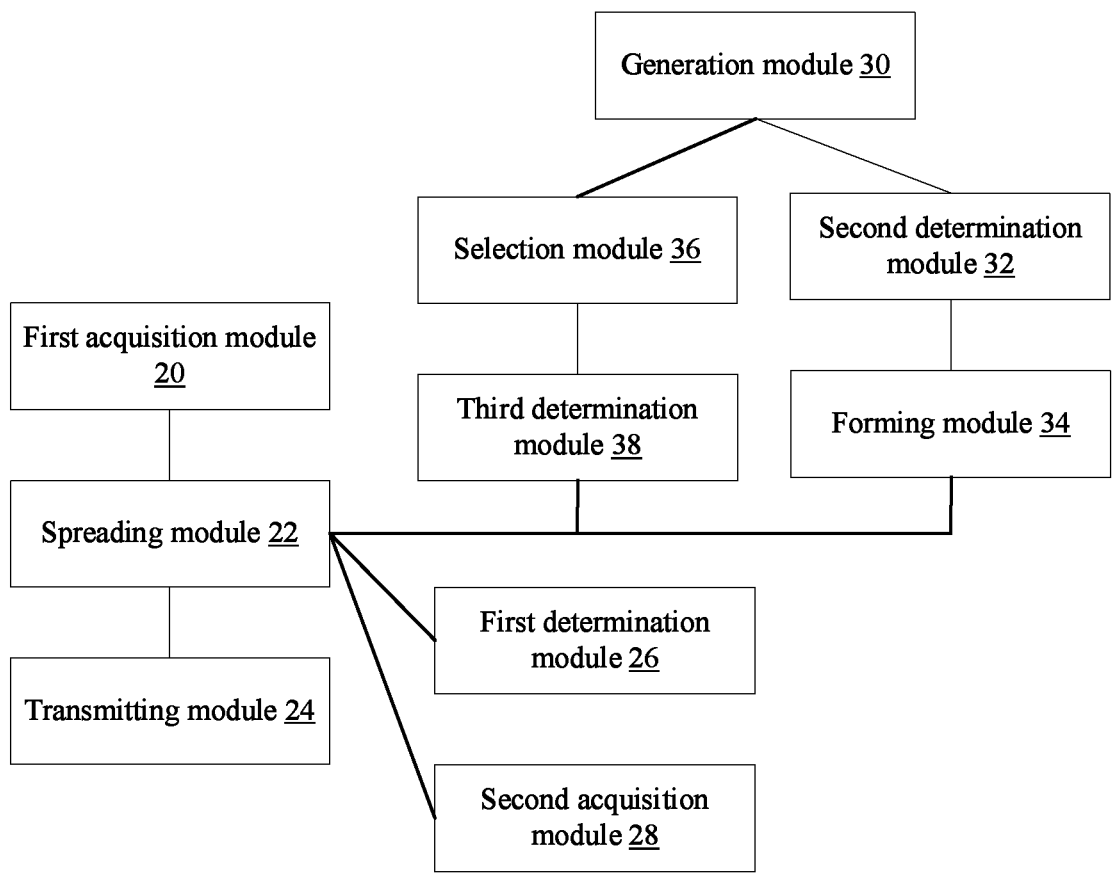

Fig. 3

| Receive transmitting signals transmitted by K transmitters, the transmitting signals are signals formed by spreading modulated signals by adopting spread sequences with a specified length respectively and then modulating the spread modulated signals to a same time-frequency resource respectively by the K transmitters, and for each transmitter, there exist N spread sequences with the specified length for N modulated symbols and there are at least two different spread sequences in the N spread sequences with the specified length, both N and K being positive integers | S402 |

| Detect the transmitting signals according to the spread sequences | S404 |

Fig. 4

MULTIUSER COMMUNICATION METHODS AND DEVICES FOR CODE DIVISION MULTIPLE ACCESS (CDMA)

TECHNICAL FIELD

The present disclosure relates to the field of communications, and more particularly to multiuser communication methods and devices for CDMA.

BACKGROUND

Uplink multiuser access may be implemented through different multiple access technologies, such as Time Division Multiple Access (TDMA), Frequency Division Multiple Access (FDMA), CDMA and Space Division Multiple Access (SDMA). The multiuser CDMA communication technology is one of the very important uplink multiuser access communication technologies, and can achieve high access performance so as to be adopted by multiple wireless communication standards.

In an access process where CDMA is adopted, at first, each access terminal may spread, via a spreading process, a data symbol subjected to digital amplitude and/or phase modulation by virtue of a spread sequence with a certain length (for example, a spread sequence with a length L may refer to that the spread sequence is formed by L symbols or L elements, where the L symbols/L elements may be L digital symbols). The spreading process may refer to a process of multiplying each modulated data symbol by each symbol of the spread sequence to finally form a symbol sequence with the same length as the adopted spread sequence. In the spreading process, a modulated data symbol (for example, a constellation point symbol modulated by adopting Quadrature Amplitude Modulation (QAM)) may be multiplied by each symbol of the spread sequence, so that each modulated data symbol may finally be spread into a symbol sequence with the same length as the adopted spread sequence. For example, when the length of the spread sequence used is equal to L, each modulated symbol may be spread into L symbols, that is, each modulated data symbol is borne on a spread symbol sequence with the length L. Then, the spread symbol sequences of all the access terminals may be transmitted on the same time-frequency resource. Finally, a base station receives a combined signal formed by superimposing spread signals of all the access terminals, and useful information of each terminal is separated from the combined signal by virtue of a multiuser receiver technology.

A communication technology applying CDMA is usually classified into a spread spectrum communication category. This is because each modulated symbol of a terminal may be spread into L symbols, and if the transmission time of the spread L times of symbols is required to be equal to the transmission time of the modulated symbols before the spreading process, the required bandwidth has to inevitably be spread by L times. This is also why a spread sequence is usually called as a spread spectrum sequence.

If spread symbols of each terminal are transmitted through a multi-carrier technology (for example, Orthogonal Frequency Division Multiplexing (OFDM) and Filter Bank Multi-Carrier (FBMC)), a combination of the two technologies is called as a Multi-Carrier Code Division Multiple Access (MC-CDMA) technology.

In a CDMA technology, a spreading process of a transmitter side is relatively simple, since it is only required to multiply each modulated symbol, for example each symbol subjected to QAM, by each symbol of a spread sequence with a length L to obtain L spread symbols, and then transmit the spread symbols through a single-carrier or multi-carrier technology. Relatively, a receiving process at a base station is not so simple.

How to achieve high CDMA performance, or more directly, how can a base station accurately separate useful data information of each terminal from a combined signal is a key of a CDMA system. Two aspects are mainly involved in the receiving process: a spread sequence and a receiver. The selection of the spread sequence is a basis of the performance, and the design of the receiver is a guarantee of the performance.

In order to achieve high access performance, spread sequences adopted by different terminals are required to have good cross-correlation characteristics in the first place. If the spread sequences are directly transmitted in a wireless multipath channel by virtue of, for example, a single-carrier code division multiplexing technology, the sequences are also required to have good self-correlation characteristics to resist delay multipath spread of the sequences.

A multi-carrier code division multiplexing technology may resist multipath by virtue of a multi-carrier technology, so that only cross-correlation characteristic, favorable for multiuser information separation, of a spread sequence needs to be considered. This is the greatest difference between single-carrier code division multiplexing and multi-carrier code division multiplexing technologies in terms of sequence selection.

A good spread sequence is a basis of performance. Multiuser information separation is finally implemented on a base station side, and a base station may achieve different corresponding performances by adopting different multiuser receiving technologies. For achieving optimal multiuser data separation performance, the base station is required to adopt a multiuser receiver technology with high performance but high complexity, such as a Successive Interference Cancellation (SIC) receiver technology.

Just because of importance of a spread sequence, a main difference between different CDMA technologies lies in spread sequence selection. A Direct Sequence-Code Division Multiple Access (DS-CDMA) technology is a most common CDMA technology, and has been adopted by multiple wireless communication standards as an uplink multiuser access technology. The spread sequence adopted in the DS-CDMA technology is based on a simplest binary Pseudo-Noise (PN) real sequence. Due to simplicity of the sequence, PN-sequence-based DS-CDMA is one of most important multi-carrier code division multiplexing technologies. In the PN-sequence-based DS-CDMA technology, each modulated symbol may be spread by a binary PN real sequence before being transmitted out through a multi-carrier technology.

A binary PN real sequence may also be called as a binary PN sequence. A value of each symbol in the binary PN real sequence may usually be represented as 0 or 1, and may alternatively be represented as a bipolar sequence, for example, 0 is represented as +1 and 1 is represented as −1, or, 0 is represented as −1 and 1 is represented as +1.

The length of a spread sequence is also a key parameter of a CDMA technology. If spread sequences are longer, low cross-correlations between the spread sequences adopted by each terminal may be ensured more easily, and moreover, it would be easier to find more sequences with low cross-correlations, so that simultaneous access of more terminals may be supported. If the number of simultaneously accessing terminals is more than length of the spread sequence, it may be indicated that the multiuser access system is in an overloaded state. It is important to note that implementation of system overloading is one of shining key attributes of a CDMA technology in future wireless communications.

In order to provide a flexible system design and support simultaneous access of more users, spread sequences adopted by access terminals are usually not mutually orthogonal. From the point of a multiuser information theory, adopting a non-orthogonal multiple access manner in an uplink direction may achieve higher system capacity or edge throughput than an orthogonal multiple access manner. Since the spread sequences of different terminals are not mutually orthogonal, demodulation performance of each user may be worsened along with increase of the number of simultaneously accessing users under a normal circumstance. In case of system overloading, interference between multiple users may get more serious. At present, a relatively large application scenario of a CDMA technology is random access or resource competition access. Each access user transmits its own modulated symbol, spread by virtue of a spread sequence, in the same time-frequency resource, which means that the same time-frequency resource is used competitively.

In the communication technology, an important factor in CDMA constraining performance is that a user may spread all modulated symbols by virtue of one and the same spread sequence, that is, all the modulated symbols are spread by virtue of the same sequence. Such a manner brings convenience to implementation of a receiver with a SIC technology, and may simplify an implementation process of SIC. However, the solution of adopting a single spread sequence is unfavorable for access performance of non-orthogonal CDMA because interference between users may not be effectively randomized or averaged.

For the problem that interference between users may not be effectively randomized or averaged because one user spreads all modulated symbols by virtue of one and the same spread sequence in the communication technology, there is yet no effective technical solution.

SUMMARY

In order to solve the technical problem, some embodiments of the present disclosure provide multiuser communication methods and devices for CDMA.

According to an embodiment of the present disclosure, a multiuser communication method for CDMA is provided, which may be applied to a transmitter and include the following acts. N modulated symbols which are obtained by modulating a code block coded by a channel coder are acquired, where N may be a positive integer more than or equal to 2. The N modulated symbols are spread according to N spread sequences with a specified length. There may be at least two different spread sequences in the N spread sequences with the specified length. The spread modulated symbols are transmitted.

In the embodiment of the present disclosure, the N spread sequences with the specified length may be acquired in one of the following manners that: the N spread sequences with the specified length are determined according to output sequences of a PN sequence generator; and the N spread sequences with the specified length are acquired from a preset table according to a preset criterion. In the embodiment, the preset table may include multiple sequences with the specified length.

In the embodiment of the present disclosure, the act that the N spread sequences with the specified length are determined according to the output sequences of the PN sequence generator may include the following acts. The PN sequence generator generates a sequence with a length R, where $R=N \times L$, and L may be a value of the specified length. The sequence with the length R is equally divided into N sequences with the specified length; and the N sequences with the specified length are determined as the N spread sequences with the specified length.

In the embodiment of the present disclosure, the act that the N spread sequences with the specified length are determined according to the output sequences of the PN sequence generator may include the following acts. The PN sequence generator generates a sequence with a preset length. The sequence with the preset length is repeated for a specified number of times to generate a sequence with a length R, where $R=N \times L$, and L may be a value of the specified length. The sequence with the length R is equally divided into N sequences with the specified length; and the N sequences with the specified length are determined as the N spread sequences with the specified length.

In the embodiment of the present disclosure, there may be L sequences with a length L in the preset table, and the L sequences with the length L may form an L-order orthogonal matrix, where L may be a value of the specified length.

In the embodiment of the present disclosure, the L sequences with the length L may form the L-order orthogonal matrix in one of the following manners that: the L sequences with the length L are arranged to form an L×L Discrete Fourier Transform (DFT) matrix; or, each element in the L×L DFT matrix is multiplied by a first preset value to form the L-order orthogonal matrix.

In the embodiment of the present disclosure, the L sequences with the length L may form the L-order orthogonal matrix in one of the following manners that: the L sequences with the length L are arranged to form an L×L Hadamard matrix; or, each element in the L×L Hadamard matrix is multiplied by a second preset value to form the L-order orthogonal matrix.

In the embodiment of the present disclosure, the L-order orthogonal matrix may be a unit matrix.

In the embodiment of the present disclosure, the spread sequences may include at least one of: real sequences and complex sequences.

In the embodiment of the present disclosure, the complex sequences may be determined in the following manner. A first real sequence with a length R is generated according to a first PN sequence generator, and a second real sequence with a length R is generated according to a second PN sequence generator, where $R=N \times L$, and L may be a value of the specified length. An ith element of the first real sequence is determined as a real part of a complex sequence, an ith element of the second real sequence is determined as an imaginary part of the complex sequence, and a complex number including the real part and the imaginary part is determined as an ith complex element of the complex sequence, where $i=1, 2, 3 \ldots, R$. R obtained complex elements sequentially form the complex sequence with the length R, and the complex sequence with the length R is equally divided into N complex sequences with the specified length.

In the embodiment of the present disclosure, after the complex sequence with the length R is equally divided into the N complex sequences with the specified length, the method may further include the following act. The N complex sequences with the specified length are multiplied by an energy normalization coefficient of the N complex sequences with the specified length to obtain N normalized complex sequences with the specified length respectively.

In the embodiment of the present disclosure, the complex sequences may be determined in the following manner. An integer sequence with a length R is generated according to the PN sequence generator. In the embodiment, elements of the integer sequence may be from an integer set $\{0, 1, \ldots, D\}$ or a set $\{1, 2, \ldots, D\}$, where $R=N \times L$, L may be a value of the specified length, and D may be the number of constellation points in a complex constellation diagram. Constellation points corresponding to the elements of the integer sequence with the length R are selected from the complex constellation diagram according to a preset mapping rule; and the complex sequences are determined according to the constellation points.

In the embodiment of the present disclosure, the complex sequences may be determined in the following manner. Real parts and imaginary parts of all complex elements in the complex sequences are generated by virtue of a PN sequence generator capable of generating M-ary real numbers, or real parts and imaginary parts of all complex elements in the complex sequences are selected from an M-ary real number set according to a specified PN criterion, where M may be an integer more than or equal to 2.

In the embodiment of the present disclosure, the M-ary real number set may meet at least one of the following conditions. M is an odd number, and the M-ary real number set is a set formed by M integers within a range $[-(M-1)/2, (M-1)/2]$. M is an even number, and the M-ary real number set is a set formed by M odd numbers within a range $[-(M-1), (M-1)]$. M is an odd number, and the M-ary real number set is a set formed by M real numbers obtained by multiplying M integers within the range $[-(M-1)/2, (M-1)/2]$ by an energy normalization coefficient corresponding to the M-ary real number set respectively. M is an even number, and the M-ary real number set is a set formed by M real numbers obtained by multiplying M odd numbers within the range $[-(M-1), (M-1)]$ by an energy normalization coefficient corresponding to the M-ary real number set respectively.

In the embodiment of the present disclosure, the complex sequences may be determined in the following manner. A first real sequence with a length R and a second real sequence with a length R are generated according to the M-ary real number set. In the embodiment, both the first real sequence and the second real sequence may adopt values in the M-ary real number set, where $R=N \times L$, and L may be a value of the specified length. An ith element of the first real sequence is determined as a real part of a complex sequence, an ith element of the second real sequence is determined as an imaginary part of the complex sequence, and a complex number including the real part and the imaginary part is determined as an ith complex element of the complex sequence, where $i=1, 2, 3 \ldots, R$. R obtained elements sequentially form the complex sequence with the length R, and the complex sequence with the length R is equally divided into N complex sequences with the specified length.

In the embodiment of the present disclosure, after the complex sequence with the length R is equally divided into the N complex sequences with the specified length, the method may further include the following act. The N complex sequences with the specified length are multiplied by an energy normalization coefficient of the N complex sequences with the specified length to obtain N normalized complex sequences with the specified length respectively.

In the embodiment of the present disclosure, the complex sequences may be determined in the following manner. An integer sequence with a length R is generated. In the embodiment, values of the integer sequence may be from an $M \times M$-ary integer set, and the $M \times M$-ary integer set may be a set formed by all integers within a range $[0, M \times M-1]$ or $[1, M \times M]$. Constellation points corresponding to elements of the integer sequence with the length R are selected from the complex constellation diagram according to a preset mapping rule. The complex sequences are determined according to the constellation points.

In the embodiment of the present disclosure, a value of M may include at least one of: 2, 3 or 4.

In the embodiment of the present disclosure, transmitting the spread modulated symbols may include the following acts. Multi-carrier modulation is performed on the modulated symbols. The modulated symbols obtained by modulation are determined as a transmitting signal of the transmitter.

According to another embodiment of the present disclosure, a multiuser communication method for CDMA is further provided, which may be applied to a receiver and include the following acts. Transmitting signals transmitted by K transmitters are received. In the embodiment, the transmitting signals may be signals formed by spreading modulated signals by adopting spread sequences with a specified length respectively and then modulating the spread modulated signals to a same time-frequency resource respectively by the K transmitters. For each transmitter, there may be N spread sequences with the specified length for N modulated symbols and there may be at least two different spread sequences in the N spread sequences with the specified length, both N and K being positive integers. The transmitting signals are detected according to the spread sequences.

According to another embodiment of the present disclosure, a multiuser communication device for CDMA is further provided, which may be applied to a transmitter and include a first acquisition module, a spreading module and a transmitting module. The first acquisition module is arranged to acquire N modulated symbols which are obtained by modulating a code block coded by a channel coder, where N may be a positive integer more than or equal to 2. The spreading module is arranged to spread the N modulated symbols according to N spread sequences with a specified length. In the embodiment, there may be at least two different spread sequences in the N spread sequences with the specified length. The transmitting module is arranged to transmit the spread modulated symbols.

In the embodiment of the present disclosure, the device may further include a first determination module and a second acquisition module. The first determination module is arranged to determine the N spread sequences with the specified length according to output sequences of a PN sequence generator. The second acquisition module is arranged to acquire the N spread sequences with the specified length from a preset table according to a preset criterion. In the embodiment, the preset table may include multiple sequences with the specified length.

In the embodiment of the present disclosure, the spread sequences may include at least one of: real sequences and complex sequences, and the device may further include a generation module, a second determination module and a forming module. The generation module is arranged to generate a first real sequence with a length R according to a first PN sequence generator, and generate a second real sequence with a length R according to a second PN sequence generator, where $R=N \times L$, and L may be a value of the specified length. The second determination module is arranged to determine an ith element of the first real sequence as a real part of a complex sequence, determine an ith element of the second real sequence as an imaginary part of the complex sequence, and determine a complex number including the real part and the imaginary part as an ith complex element of the complex sequence, where i=1, 2, 3 . . . , R. The forming module is arranged to sequentially arrange R obtained complex elements to form the complex sequence with a length R, and equally divide the complex sequence with the length R into N complex sequences with the specified length.

In the embodiment of the present disclosure, the generation module may further be arranged to generate an integer sequence with a length R according to a PN sequence generator. In the embodiment, elements of the integer sequence may be from an integer set $\{0, 1, \ldots, D\}$ or a set $\{1, 2, \ldots, D\}$, R=N×L, L may be a value of the specified length, and D may be the number of constellation points in a complex constellation diagram. The device may further include a selection module and a third determination module. The selection module may be arranged to select, from the complex constellation diagram, constellation points corresponding to the elements of the integer sequence with the length R according to a preset mapping rule. The third determination module may be arranged to determine the complex sequences according to the constellation points.

In the embodiment of the present disclosure, the selection module may be arranged to generate real parts and imaginary parts of all the complex elements in the complex sequences by virtue of a PN sequence generator capable of generating M-ary real numbers, or select real parts and imaginary parts of all complex elements in the complex sequences from an M-ary real number set according to a specified PN criterion, where M may be an integer more than or equal to 2.

According to another embodiment of the present disclosure, a multiuser communication device for CDMA is further provided, which may be applied to a receiver and include a receiving module and a detection module. The receiving module is arranged to receive transmitting signals transmitted by K transmitters. In the embodiment, the transmitting signals may be signals formed by spreading modulated signals by adopting spread sequences with a specified length respectively and then modulating the spread modulated signals to a same time-frequency resource respectively by the K transmitters. For each transmitter, there may be N spread sequences with the specified length for N modulated symbols and there may be at least two different spread sequences in the N spread sequences with the specified length, both N and K being positive integers. The detection module is arranged to detect the transmitting signals according to the spread sequences.

According to the embodiments of the present disclosure, the technical solution of spreading the modulated symbols by virtue of the N spread sequences including at least two different spread sequences is adopted, so that the problem that interference between users may not be effectively randomized or averaged because one user spreads all modulated symbols by virtue of one and the same spread sequence in the communication technology is solved. Multiple access performance is improved, and each access user may spread modulated symbols by virtue of multiple different spread sequences to effectively randomize or average the interference between the users.

BRIEF DESCRIPTION OF THE DRAWINGS

The drawings described here are adopted to provide a further understanding to the present disclosure, and form a part of the present disclosure. In the drawings:

FIG. 3 is another structure block diagram of a multiuser communication device for CDMA according to an embodiment of the present disclosure;

FIG. 4 is another flowchart of a multiuser communication method for CDMA according to an embodiment of the present disclosure;

DETAILED DESCRIPTION OF THE EMBODIMENTS

The present disclosure will be described below in detail with reference to the drawings and the embodiments. It may be appreciated that the embodiments in the present disclosure and characteristics in the embodiments may be combined under the condition of no conflicts.

Figure 1:
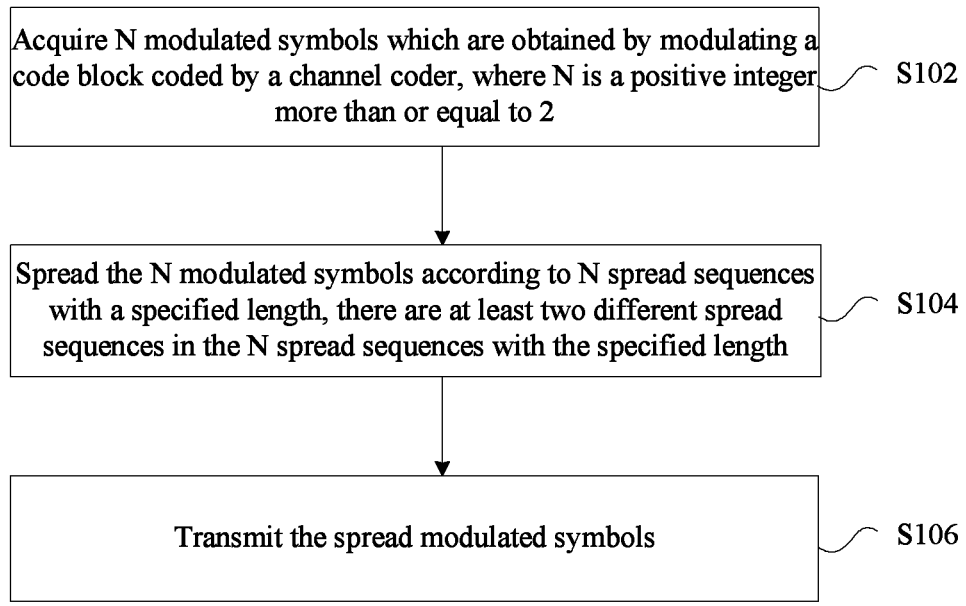
FIG. 1 is a flowchart of a multiuser communication method for CDMA according to an embodiment of the present disclosure.

An embodiment provides a multiuser communication method for CDMA, which is applied to a transmitter side. FIG. 1 is a flowchart of a multiuser communication method for CDMA according to an embodiment of the present disclosure. As shown in FIG. 1, the flow may include the following acts.

At act S102, N modulated symbols which are obtained by modulating a code block coded by a channel coder are acquired, where N is a positive integer more than or equal to 2.

At act S104, the N modulated symbols are spread according to N spread sequences with a specified length. In the embodiment, there may be at least two different spread sequences in the N spread sequences with the specified length.

At act S106, the spread modulated symbols are transmitted.

By each of the abovementioned acts, the technical solution of spreading the modulated symbols by virtue of the N spread sequences including at least two different spread sequences is adopted, so that the problem that interference between users may not be effectively randomized or averaged because one user spreads all modulated symbols by virtue of one and the same spread sequence in the communication technology is solved. Each access user may spread modulated symbols by virtue of multiple different spread sequences to effectively randomize or average the interference between the users, and multiple access performance is improved.

For the N spread sequences with the specified length in act S104, the following two manners for acquiring the N spread sequences with the specified length are provided in an exemplary embodiment of the present disclosure, which is only adopted as an example and not intended to limit the embodiment of the present disclosure.

(1) The N spread sequences with the specified length are determined according to output sequences of a PN sequence generator. (2) The N spread sequences with the specified length are acquired from a preset table according to a preset criterion. In the embodiment, the preset table may include multiple sequences.

In a specific implementation process, the manner (1) of acquiring the N spread sequences with the specified length may be implemented in the following two manners.

First Manner

The PN sequence generator generates a sequence with a length R, where R=N×L, and L is a value of the specified length. The sequence with the length R is equally divided into N sequences with the specified length; and the N sequences with the specified length are determined as the N spread sequences with the specified length.

Second Manner

The PN sequence generator generates a sequence with a preset length. The sequence with the preset length is repeated for a specified number of times to generate a sequence with a length R, where R=N×L, and L is a value of the specified length. The sequence with the length R is equally divided into N sequences with the specified length; and the N sequences with the specified length are determined as the N spread sequences with the specified length. For example, the PN sequence generator generates a sequence with a preset length 2, and when N is 4 and the specified length is 3, the sequence is repeated for six times to generate a sequence with a sequence length 12, and the sequence with the length 12 is equally divided into 4 spread sequences with the specified length 3.

In the manner (2) of acquiring the N spread sequences with the specified length, there may be L sequences with a length L in the preset table. The L sequences with the length L may form an L-order orthogonal matrix. There may be multiple manners for forming the L-order orthogonal matrix. In an exemplary embodiment of the present disclosure, the following manner may be adopted for implementation: the L sequences with the length L are arranged to form an L×L DFT matrix; or, each element in the L×L DFT matrix is multiplied by a first preset value to form the L-order orthogonal matrix; or, the L sequences with the length L are arranged to form an L×L Hadamard matrix; or, each element in the L×L Hadamard matrix is multiplied by a second preset value to form the L-order orthogonal matrix. Those skilled in the art may set the first preset value and the second preset value purely according to experiences and a practical condition, which will not be limited in the exemplary embodiment of the present disclosure.

For simplicity and convenience, during practical application, a unit matrix may be directly selected as the orthogonal matrix.

It may be appreciated that the spread sequences provided by the embodiment of the present disclosure may be real matrixes, but during practical application, for achieving simplicity, most current mainstream CDMA technologies may adopt binary PN real sequences as spread sequences. However, it is difficult to ensure low cross-correlations between the binary PN real sequences, particularly binary PN real sequences with relatively small lengths, which may cause serious interference between multiple users and inevitably influence multiuser access performance. For solving this technical problem, an exemplary embodiment of the present disclosure further provides the following technical solution. The spread sequences may further be implemented through complex sequences, that is, each user may further spread modulated symbols by virtue of multiple different complex spread sequences to improve the access performance by virtue of a low cross-correlation potential, greater than that of the binary real sequences, of the complex sequences. For the complex sequences, the embodiment of the present disclosure provides the following four manners for determining the complex sequences. It may be appreciated that the four determination manners provided below may be combined or independently used when required, which will not be limited in the embodiment of the present disclosure.

1) The complex sequences may be determined in the following manner. A first real sequence with a length R is generated according to a first PN sequence generator, and a second real sequence with a length R is generated according to a second PN sequence generator, where R=N×L, and L is a value of the specified length. An ith element of the first real sequence is determined as a real part of a complex sequence, an ith element of the second real sequence is determined as an imaginary part of the complex sequence, and a complex number including the real part and the imaginary part is determined as an ith complex element of the complex sequence, where i=1, 2, 3 . . . , R. R obtained complex elements sequentially form the complex sequence with a length R, and the complex sequence with the length R is equally divided into N complex sequences with the specified length.

Alternatively, the N complex sequences with the specified length may further be multiplied by an energy normalization coefficient of the N complex sequences with the specified length to obtain N normalized complex sequences with the specified length respectively.

In the embodiment of the present disclosure, there may be two PN sequence generators which directly output the first real sequence and the second real sequence respectively, the real parts and imaginary parts of the complex sequences may be directly determined according to the first real sequence and the second real sequence. The real parts and imaginary parts of the complex sequences may also be determined by virtue of a complex constellation diagram.

2) The complex sequences may be determined in the following manner.

An integer sequence with a length R is generated according to the PN sequence generator. In the embodiment, elements of the integer sequence are from an integer set $\{0, 1, \ldots, D\}$ or a set $\{1, 2, \ldots, D\}$, R=N×L, L is a value of the specified length, and D is the number of constellation points in a complex constellation diagram. Constellation points corresponding to the elements of the integer sequence with the length R are selected from the complex constellation diagram according to a preset mapping rule. The complex sequences are determined according to the constellation points.

3) The complex sequences may be determined in the following manner.

Real parts and imaginary parts of all complex elements in the complex sequences are generated by virtue of a PN sequence generator capable of generating M-ary real numbers, or real parts and imaginary parts of all complex elements in the complex sequences are selected from an M-ary real number set according to a specified PN criterion, where M is an integer more than or equal to 2. The complex sequences are determined according to the selected real parts and imaginary parts of all the complex elements. The embodiment of the present disclosure may actually be understood as that the real parts and imaginary parts of the complex sequences are determined according to the determined first real sequence and second real sequence. In the embodiment of the present disclosure, data extraction is performed on the output sequences of the PN sequence generator to determine the first real sequence and the second real sequence to further determine the real parts and imaginary parts of the complex sequences.

It may be appreciated that the real number set in the embodiment may meet at least one of the following conditions. The M-ary real number set is a set formed by M integers within a range $[-(M-1)/2, (M-1)/2]$, where M is an odd number. The M-ary real number set is a set formed by M odd numbers within a range $[-(M-1), (M-1)]$, where M is an even number. The M-ary real number set is a set formed by M real numbers obtained by multiplying M integers within the range $[-(M-1)/2, (M-1)/2]$ by an energy normalization coefficient corresponding to the M-ary real number set respectively, where M is an odd number. The M-ary real number set is a set formed by M real numbers obtained by multiplying M odd numbers within the range $[-(M-1), (M-1)]$ by an energy normalization coefficient corresponding to the M-ary real number set respectively, where M is an even number. In the embodiment, a value of M may include at least one of: 2, 3 or 4.

The complex sequences may be determined in the following manner. A first real sequence with a length R and a second real sequence with a length R are generated according to the M-ary real number set. In the embodiment, both the first real sequence and the second real sequence adopt values in the M-ary real number set, where R=N×L, and L is a value of the specified length. An ith element of the first real sequence is determined as a real part of a complex sequence, an ith element of the second real sequence is determined as an imaginary part of the complex sequence, and a complex number including the real part and the imaginary part is determined as an ith complex element of the complex sequence, where i=1, 2, 3 . . . , R. R obtained elements sequentially form the complex sequence with a length R, and the complex sequence with the length R is equally divided into N complex sequences with the specified length.

Alternatively, in order to make results of the complex sequences more standard, after the complex sequence with the length R is equally divided into the N complex sequences with the specified length, the following process may further be executed. The N complex sequences with the specified length may be multiplied by an energy normalization coefficient of the N complex sequences with the specified length to obtain N normalized complex sequences with the specified length respectively.

4) The complex sequences may be determined in the following manner. An integer sequence with a length R is generated. In the embodiment, values of the integer sequence are from an M×M-ary integer set, and the M×M-ary integer set is a set formed by all integers within a range $[0, M×M-1]$ or $[1, M×M]$. Constellation points corresponding to elements of the integer sequence with the length R are selected from the complex constellation diagram according to a preset mapping rule. After the process of determining the spread sequence is executed and the modulated symbols are spread according to the spread sequences, Step S106 may be implemented in the following manner. Multi-carrier modulation may be performed on the modulated symbols. The modulated symbols obtained by modulation may be determined as a transmitting signal of a transmitter.

Another embodiment provides a multiuser communication device for CDMA, which is applied to a transmitter. The device is arranged to implement the abovementioned embodiment and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 2:
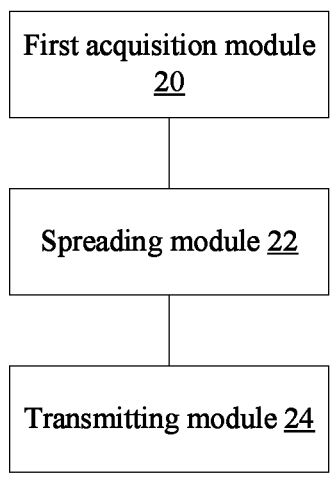
FIG. 2 is a structure block diagram of a multiuser communication device for CDMA according to an embodiment of the present disclosure.

FIG. 2 is a structure block diagram of a multiuser communication device for CDMA according to an embodiment of the present disclosure. As shown in FIG. 2, the device may include a first acquisition module 20, a spreading module 22 a transmitting module 24.

The first acquisition module 20 is arranged to acquire N modulated symbols which are obtained by modulating a code block coded by a channel coder, where N is a positive integer more than or equal to 2.

The spreading module 22 is coupled with the first acquisition module 20 and arranged to spread the N modulated symbols according to N spread sequences with a specified length. In the embodiment, there may be at least two different spread sequences in the N spread sequences with the specified length.

The transmitting module 24 is coupled with the spreading module 22 and arranged to transmit the spread modulated symbols.

By combined actions of each of the abovementioned modules, the technical solution of spreading the modulated symbols by virtue of the N spread sequences including at least two different spread sequences is adopted, so that the problem that interference between users may not be effectively randomized or averaged because one user spreads all modulated symbols by virtue of one and the same spread sequence in the communication technology is solved. Each access user may spread modulated symbols by virtue of multiple different spread sequences to effectively randomize or average the interference between the users, and multiple access performance is improved.

In order to determine the spread sequences in the embodiment, as shown in FIG. 3, the device may further include a first determination module 26 and a second acquisition module 28. The first determination module 26 is coupled with the spreading module 22 and arranged to determine the N spread sequences with the specified length according to output sequences of a PN sequence generator. The second acquisition module 28 is coupled with the spreading module 22 and arranged to acquire the N spread sequences with the specified length from a preset table according to a preset criterion. In the embodiment, the preset table may include multiple sequences.

Alternatively, when the spread sequences include at least one of: real sequences and complex sequences, the device may further include a generation module 30, a second determination module 32 and a forming module 34. The generation module 30 is arranged to generate a first real sequence with a length R according to a first PN sequence generator, and generate a second real sequence with a length R according to a second PN sequence generator, where R=N×L, and L is a value of the specified length.

The second determination module 32 is coupled with the generation module 30 and arranged to determine an ith element of the first real sequence as a real part of a complex sequence, determine an ith element of the second real sequence as an imaginary part of the complex sequence, and determine a complex number including the real part and the imaginary part as an ith complex element of the complex sequence, where i=1, 2, 3 . . . , R.

The forming module 34 is coupled with the second determination module 32 and arranged to sequentially arrange R obtained complex elements to form the complex sequence with the length R, and equally divide the complex sequence with the length R into N complex sequences with the specified length.

In the embodiment of the present disclosure, the technical solution is further improved in a manner that the generation module 30 is further arranged to generate an integer sequence with a length R according to a PN sequence generator. In the embodiment, elements of the integer sequence are from an integer set {0, 1, . . . , D} or a set {1, 2, . . . , D}, R=N×L, L is a value of the specified length, and D is the number of constellation points in a complex constellation diagram. The device may further include a selection module 36 and a third determination module 38. The selection module 36 is coupled with the generation module 30, and is arranged to select, from the complex constellation diagram, constellation points corresponding to the elements of the integer sequence with the length R according to a preset mapping rule. The third determination module 38 is coupled with the selection module 36, and is arranged to determine the complex sequences according to the constellation points.

Alternatively, the selection module 36 may be arranged to generate real parts and imaginary parts of all the complex elements in the complex sequences by virtue of a PN sequence generator capable of generating M-ary real numbers, or select real parts and imaginary parts of all complex elements in the complex sequences from an M-ary real number set according to a specified PN criterion, where M is an integer more than or equal to 2. The third determination module 38 may be arranged to determine the complex sequences according to the selected real parts and imaginary parts of all the complex elements.

In order to further improve the technical solution provided by the embodiment, in the embodiment, a multiuser communication method for CDMA is provided, which is applied to a receiver side. FIG. 4 is a flowchart of a multiuser communication method for CDMA according to an embodiment of the present disclosure. As shown in FIG. 4, the flow may include the following acts.

At act S402, transmitting signals transmitted by K transmitters are received. In the embodiment, the transmitting signals are signals formed by spreading modulated signals by adopting spread sequences with a specified length respectively and then modulating the spread modulated signals to a same time-frequency resource respectively by the K transmitters. For each transmitter, there exist N spread sequences with the specified length for N modulated symbols and there may be at least two different spread sequences in the N spread sequences with the specified length, both N and K being positive integers.

At act S404, the transmitting signals are detected according to the spread sequences.

By each of the abovementioned acts, the technical solution of spreading modulated symbols, transmitted by the transmitters, in each transmitter according to the N spread sequences with at least two different spread sequences is adopted, so that the problem that interference between users may not be effectively randomized or averaged because one user spreads all modulated symbols by virtue of one and the same spread sequence in the communication technology is solved. Each access user may spread modulated symbols by virtue of multiple different spread sequences to effectively randomize or average the interference between the users, and multiple access performance is improved.

Another embodiment provides a multiuser communication device for CDMA, which is applied to a receiver. The device is arranged to implement the abovementioned embodiment and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 5:
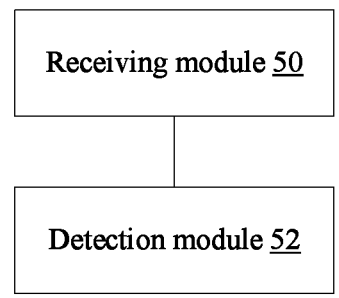
FIG. 5 is another structure block diagram of a multiuser communication device for CDMA according to an embodiment of the present disclosure.

FIG. 5 is a structure block diagram of a multiuser communication device for CDMA according to an embodiment of the present disclosure. As shown in FIG. 5, the device may include a receiving module 50 and a detection module 52.

The receiving module 50 is arranged to receive transmitting signals transmitted by K transmitters. In the embodiment, the transmitting signals are signals formed by spreading modulated signals by adopting spread sequences with a specified length respectively and then modulating the spread modulated signals to a same time-frequency resource respectively by the K transmitters. For each transmitter, there exist N spread sequences with the specified length for N modulated symbols and there may be at least two different spread sequences in the N spread sequences with the specified length, both N and K being positive integers.

The detection module 52 is coupled with the receiving module 50 and arranged to detect the transmitting signals according to the spread sequences.

By combined actions of each of the abovementioned modules, the technical solution of spreading modulated symbols, transmitted by the transmitters, in each transmitter according to the N spread sequences with at least two different spread sequences is adopted, so that the problem that interference between users may not be effectively randomized or averaged because one user spreads all modulated symbols by virtue of one and the same spread sequence in the communication technology is solved. Each access user may spread modulated symbols by virtue of multiple different spread sequences to effectively randomize or average the interference between the users, and multiple access performance is improved.

In order to make a multiuser communication process for CDMA in the abovementioned embodiments understood better, descriptions will be made below with reference to the following exemplary embodiments. However, it may be appreciated that the descriptions are not intended to limit the embodiments of the present disclosure.

It may be appreciated that "L" in exemplary examples of the present disclosure may be understood as the specified length in the abovementioned embodiments of the present disclosure.

First Exemplary Embodiment

Figure 6:
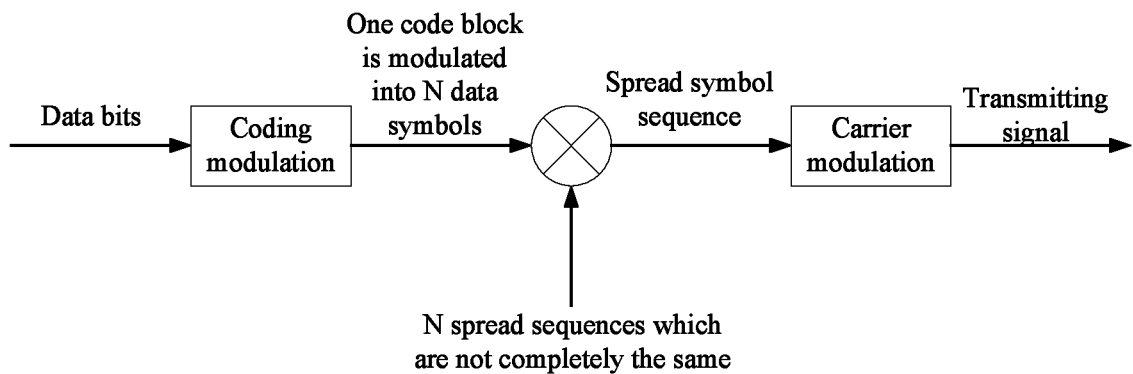
FIG. 6 is a schematic diagram of a signal processing process of a transmitter according to a first exemplary embodiment and embodiment 2 of the present disclosure.

FIG. 6 is a processing flowchart of a signal of a transmitter according to a first exemplary embodiment of the present disclosure. As shown in FIG. 6, the embodiment provides a multiuser CDMA communication method and a corresponding transmitter and receiver. A signal processing process of the transmitter (such as a terminal in a transceiver system, also called as a terminal transmitter) is shown in FIG. 6. Coding modulation is performed on data bits to be transmitted to obtain a plurality of data symbols at first. Here, it is set that a code block coded by a channel coder is modulated to obtain N data symbols, and the N data symbols are spread to obtain a spread symbol sequence by virtue of N spread sequences which are not completely the same. The spreading process with the N spread sequences which are not completely the same may achieve a purpose of randomizing inter-user interference. Carrier modulation is performed on the spread symbol sequence to form a transmitting signal for transmitting.

Figure 7:
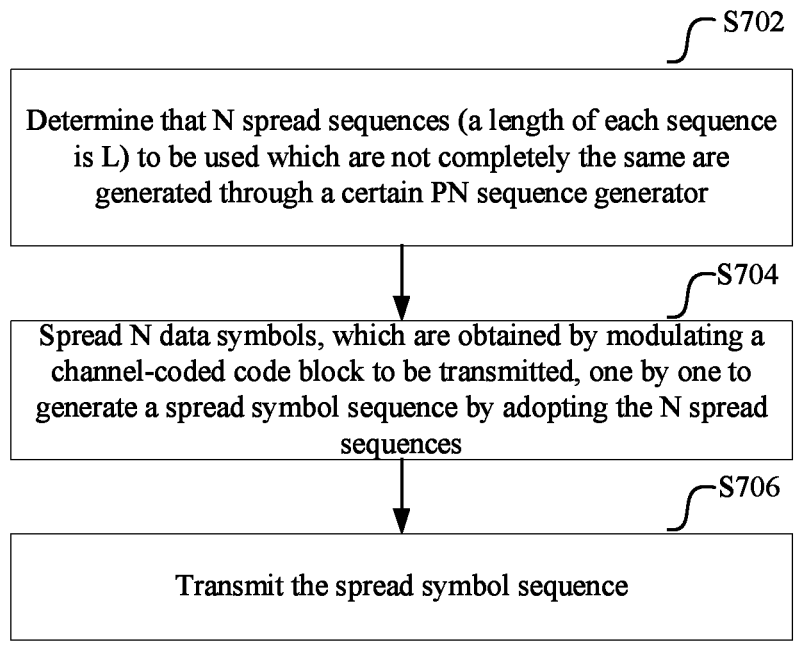
FIG. 7 is a flowchart of a multiuser CDMA communication method for a transmitter side according to a first exemplary embodiment of the present disclosure.

In a first exemplary embodiment of the present disclosure, a flow of a multiuser CDMA communication method for a transmitter side, as shown in FIG. 7, may include the following acts.

At act S702, it is determined that N spread sequences (a length of each sequence is L) to be used which are not completely the same are generated through a certain PN sequence generator.

At act S704, N data symbols, which are obtained by modulating a channel-coded code block to be transmitted, are spread one by one to generate a spread symbol sequence by adopting the N spread sequences.

The spreading process in act S704 refers to multiplying each modulated data symbol obtained by coding modulation by each element of the corresponding spread sequence with the length L. In the process, spread sequences for different modulated symbols corresponding to a code block are not completely the same. In such a manner, each modulated symbol is spread to form a symbol sequence with the length L, and the N modulated symbols corresponding to the code block are spread to form a symbol sequence with a length N×L.

At act S706, the spread symbol sequence is transmitted.

At act S706, multi-carrier modulation may preferably be performed on the spread symbol sequence to form a transmitting signal for transmitting.

In an alternative example, it is determined that the N spread sequences to be used, which are not completely the same, with the length L are formed by generating, by the PN sequence generator, a sequence with the length N×L and equally dividing the sequence with the length N×L into N parts.

The PN sequence generator may directly output or generate, by repeating, the generated sequence with the length N×L.

Two PN real sequence generators may directly output or generate, by repeating, two real sequences with the length N×L, then elements of the two real sequences are determined as real parts and imaginary parts of N×L complex numbers respectively, and the N×L complex numbers form the complex sequence with the length N×L.

A PN real sequence generator may directly output or generate, by repeating, a real sequence with a length 2×N×L, then elements at N×L even positions and N×L odd positions are determined as real parts and imaginary parts of the N×L complex numbers, and the N×L complex numbers form the complex sequence with the length N×L.

A certain PN integer sequence generator may directly output or generate, by repeating, an integer sequence with the length N×L, and corresponding complex numbers are selected from a complex constellation diagram to form the complex sequence with the length N×L by taking elements of the integer sequence as indexes.

Finally, the sequence with the length N×L is equally divided into N segments to form the N spread sequences, which are not completely the same, with the length L.

Second Exemplary Embodiment

A second exemplary embodiment of the present disclosure provides a multiuser CDMA communication method and a corresponding transmitter and receiver. A signal processing process of the transmitter (such as a terminal in a transceiver system, also called as a terminal transmitter) is shown in FIG. 6. Coding modulation is performed on data bits to be transmitted to obtain a plurality of data symbols at first. Here, it is set that a code block coded by a channel coder is modulated to obtain N data symbols, and the N data symbols are spread to obtain a spread symbol sequence by virtue of N spread sequences which are not completely the same. The spreading process with the N spread sequences which are not completely the same may achieve a purpose of randomizing inter-user interference. Carrier modulation is performed on the spread symbol sequence to form a transmitting signal for transmitting.

Figure 8:
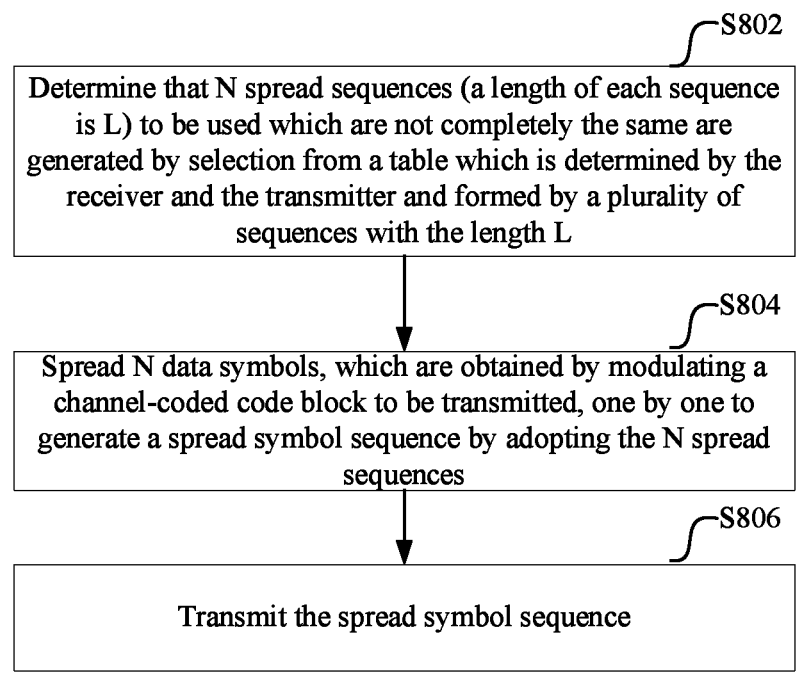
FIG. 8 is a flowchart of a multiuser CDMA communication method for a transmitter side according to a second exemplary embodiment of the present disclosure.

In the exemplary embodiment of the present disclosure, a flow of a multiuser CDMA communication method for a transmitter side, as shown in FIG. 8, may include the following acts.

At act S802, it is determined that N spread sequences (a length of each sequence is L) to be used which are not completely the same are selected, according to a specified PN criterion, from a table which is determined by the receiver and the transmitter and formed by a plurality of sequences with the length L.

At act S804, N data symbols, which are obtained by modulating a channel-coded code block to be transmitted, are spread one by one to generate a spread symbol sequence by adopting the N spread sequences.

The spreading process in the act refers to multiplying each modulated data symbol obtained by coding modulation by each element of the corresponding spread sequence with the length L. In the process, spread sequences for different modulated symbols corresponding to a code block are not completely the same. In such a manner, each modulated symbol is spread to form a symbol sequence with the length L, and the N modulated symbols corresponding to the code block are spread to form a symbol sequence with a length N×L.

At act S806, the spread symbol sequence is transmitted.

In the act, multi-carrier modulation may preferably be performed on the spread symbol sequence to form a transmitting signal for transmitting.

In an example, at act S802, it is determined that the N spread sequences to be used, which are not completely the same, with the length L are formed by selecting for N times from the table which is determined by the receiver and the transmitter and formed by the sequence with the length L according to the specified PN criterion.

The N spread sequences which are not completely the same may also be formed by selecting, according to a specified PN criterion, for N times from a table which is determined by the receiver and the transmitter and formed by L mutually orthogonal sequences with the length L. Here, the L mutually orthogonal sequences with the length L form an L×L DFT matrix, or form an orthogonal matrix, the orthogonal matrix being a matrix obtained by dividing each element of the L×L DFT matrix by the same value. Here, the L mutually orthogonal sequences with the length L may also form an L×L Hadamard matrix, or form an orthogonal matrix, the orthogonal matrix being a matrix obtained by dividing each element of the L×L Hadamard matrix by the same value. Here, the L mutually orthogonal sequences with the length may further form an L×L unit matrix.

Third Exemplary Embodiment

The exemplary embodiment of the present disclosure provides a multiuser CDMA communication method and a corresponding transmitter and receiver. A signal processing process of the transmitter (such as a terminal in a transceiver system, also called as a terminal transmitter) is shown in FIG. 6. Coding modulation is performed on data bits to be transmitted to obtain a plurality of data symbols at first. Here, it is set that a code block coded by a channel coder is modulated to obtain N data symbols, and the N data symbols are spread to obtain a spread symbol sequence by virtue of N spread sequences which are not completely the same. The spreading process with the N spread sequences which are not completely the same may achieve a purpose of randomizing inter-user interference. Carrier modulation is performed on the spread symbol sequence to form a transmitting signal for transmitting.

In the embodiment, a flow of a multiuser CDMA communication method for a transmitter side, as shown in FIG. 7 or 8, may include the following acts.

At act S702 or act S802, it is determined that N spread sequences to be used with a length L are all complex spread sequences, each element of the complex spread sequences is a complex number and values of real parts and imaginary parts of all the elements in the complex spread sequences are from an M-ary real number set, where M is an integer more than or equal to 2.

The M-ary real number set is a set formed by M real numbers, and as an exemplary embodiment, the M-ary real number set may be one of the following sets.

M is an odd number, and the M-ary real number set is a set formed by M integers within a range [−(M−1)/2, (M−1)/2].

M is an even number, and the M-ary real number set is a set formed by M odd numbers within a range [−(M−1), (M−1)].

M is an odd number, and the M-ary real number set is a set formed by M real numbers obtained by multiplying M integers within the range [−(M−1)/2, (M−1)/2] by an energy normalization coefficient corresponding to the M-ary real number set respectively.

M is an even number, and the M-ary real number set is a set formed by M real numbers obtained by multiplying M odd numbers within the range [−(M−1), (M−1)] by an energy normalization coefficient corresponding to the M-ary real number set respectively.

At act S704 or act S804, data symbols to be transmitted are spread to generate a spread symbol sequence by adopting the complex spread sequences. The spreading process in the act referring to performing complex multiplication on each data symbol obtained by coding modulation and each element (complex symbol) of the complex spread sequences to finally form complex symbol sequences with the same length as the adopted spread sequences.

At act S706 or act S806, the spread symbol sequence is transmitted.

In the act, multi-carrier modulation is preferably performed on the spread symbol sequence to form a transmitting signal for transmitting.

In an example, determining the complex spread sequences to be used in act S702 may include the following acts. A PN first real sequence and a PN second real sequence are generated, values of all elements in the first real sequence and the second real sequence are from the M-ary real number set and the numbers of the elements included in the first real sequence and the second real sequence are both equal to a number N×L of the elements of the complex sequences. An ith element of the first real sequence is determined as a real part, an ith element of the second real sequence is determined as an imaginary part, and a complex number including the real part and the imaginary part is determined as an ith element of a complex spread sequence, where i=1, 2, . . . , N×L, and L is an integer more than or equal to 2. N×L obtained elements sequentially form the complex sequence with a length N×L, and the complex sequence with the length N×L is equally divided into N parts to form N spread sequences with a length L, or, L complex numbers of the N parts are multiplied by a corresponding energy normalization coefficient to sequentially form the N complex spread sequences with the length L.

In another example, determining the complex spread sequences to be used in act S702 may include the following acts. A PN integer sequence is generated. The integer has N×L elements, values of all the elements are from an M×M-ary integer set, the M×M-ary integer set is a set formed by all integers within a range [0, M×M−1] or [1, M×M] and L is an integer more than or equal to 2. N×L corresponding constellation points are selected from a complex constellation diagram with M×M points for the N×L elements of the PN integer sequence according to a preset mapping rule. N×L complex numbers corresponding to the N×L constellation points are determined, and the complex sequence with the length N×L is equally divided into N parts to form the N spread sequences with the length L, or, L complex numbers of the N parts are multiplied by the corresponding energy normalization coefficient to sequentially form the N complex spread sequences with the length L.

Figure 9:
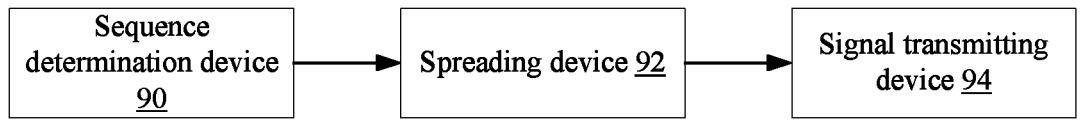
FIG. 9 is a module diagram of a transmitter according to a third exemplary embodiment of the present disclosure.

Correspondingly, the transmitter in a multiuser CDMA communication system in the embodiment, as shown in FIG. 9, may include: a sequence determination device 90, a spreading device 92 and a signal transmitting device 94.

The sequence determination device 90 is arranged to determine N spread sequences to be used. The N spread sequences are not completely the same, each element of all the sequences is a complex number and values of real parts and imaginary parts of all the elements in the complex spread sequences are from an M-ary real number set, where M is an integer more than or equal to 2.

The spreading device 92 is arranged to perform spreading process on data symbols to be transmitted to generate a spread symbol sequence by adopting the complex spread sequences.

The signal transmitting device 94 is arranged to transmit the spread symbol sequence. Multi-carrier modulation is preferably performed on the spread symbol sequence to form a transmitting signal for transmitting.

As an exemplary embodiment, the values of the real parts and imaginary parts of all the elements in the complex spread sequences determined by the sequence determination device 90 are from the M-ary real number set. In the embodiment, one of the following conditions is satisfied.

M is an odd number, and the M-ary real number set is a set formed by M integers within a range [−(M−1)/2, (M−1)/2].

M is an even number, and the M-ary real number set is a set formed by M odd numbers within a range [−(M−1), (M−1)].

M is an odd number, and the M-ary real number set is a set formed by M real numbers obtained by multiplying M integers within the range [−(M−1)/2, (M−1)/2] by an energy normalization coefficient corresponding to the M-ary real number set respectively.

M is an even number, and the M-ary real number set is a set formed by M real numbers obtained by multiplying M odd numbers within the range [−(M−1), (M−1)] by an energy normalization coefficient corresponding to the M-ary real number set respectively.

In the solution, the transmitter performs spreading processing on the data symbols to be transmitted by adopting specific complex sequences as the spread sequences, and the receiver identifies the signal transmitted by the transmitter. When multiple transmitters simultaneously transmit information to the receiver through the same time-frequency resource, each transmitter performs spreading processing on respective data symbols to be transmitted by adopting respective complex spread sequences respectively, so that the receiver may identify signals transmitted by different transmitters.

Each user spreads modulated symbols by virtue of multiple different spread sequences, so that interference between the users may be effectively randomized or averaged. A complex sequence (that is, each element in the sequence is a complex number) may have a higher degree of design freedom than a binary real sequence, so that it is easier to select a sequence set with a low cross-correlation as a spread sequence set for CDMA. Therefore, the solution may achieve higher CDMA performance, support a higher system overloading level and improve experiences of the users in non-orthogonal overloaded access and communication.

Fourth Exemplary Embodiment

Figure 10:
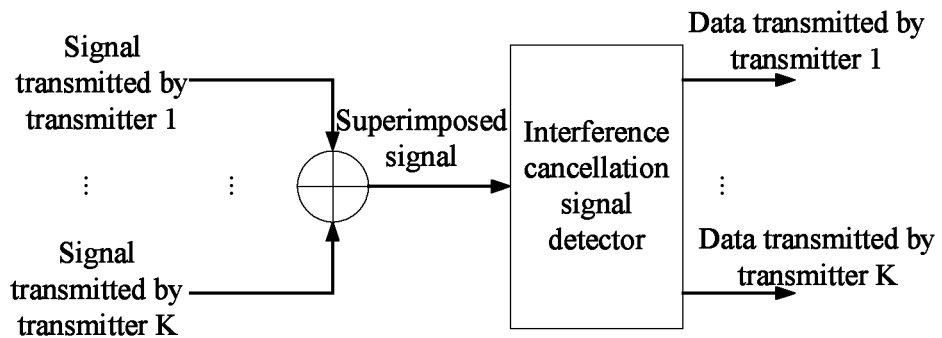
FIG. 10 is a schematic diagram of signal receiving and processing of a receiver according to a fourth exemplary embodiment of the present disclosure.

A fourth exemplary embodiment of the present disclosure involves a multiuser CDMA communication method for a receiver side and a corresponding receiver. A signal receiving and processing principle of the receiver (such as a base station in a transceiver system) is shown in FIG. 10. In FIG. 10, after signals transmitted by K transmitters (processing during signal transmitting of each transmitter is shown in FIG. 6) are wirelessly transmitted over the air, the receiver receives a superimposed signal of the signals transmitted by the K transmitters, and an interference cancellation signal detector performs receiving detection on the superimposed signal to obtain data transmitted by each transmitter. In the embodiment of the present disclosure, the interference cancellation signal detector is an SIC signal detector.

Figure 11:
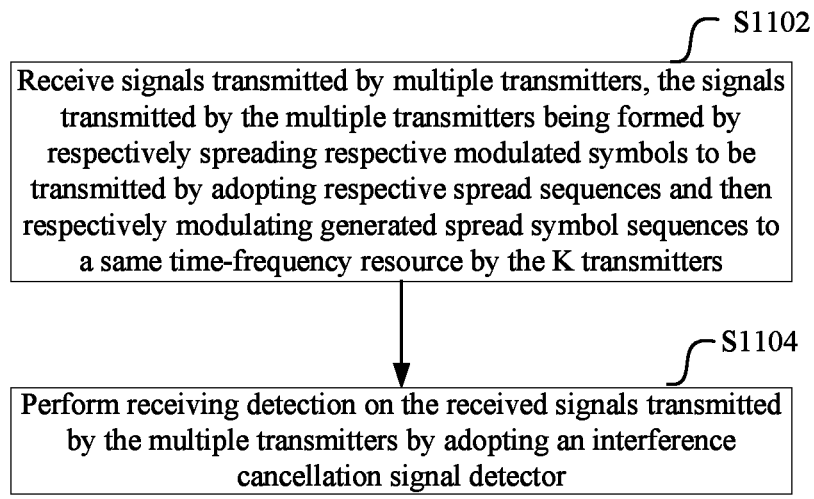
FIG. 11 is a flowchart of a multiuser CDMA communication method for a receiver side according to a fourth exemplary embodiment of the present disclosure.

FIG. 11 shows a flow of the multiuser CDMA communication method for the receiver side, including the following acts.

At act S1102, signals transmitted by multiple transmitters are received. The signals transmitted by the multiple transmitters are formed by spreading respective modulated symbols to be transmitted by adopting respective spread sequences respectively and then modulating generated spread symbol sequences to a same time-frequency resource respectively by the K transmitters.

At act S1102, the spread sequences adopted by each transmitter are not completely the same, and are generated through a certain PN sequence generator, or are selected, according to a specified PN criterion, for a plurality of times from a table which is determined by the receiver and the transmitter and formed by a plurality of sequences with a length L.

At act S1104, receiving detection is performed on the received signals transmitted by the multiple transmitters by adopting an interference cancellation signal detector, and the spread sequences used by the multiple transmitters are used during detection.

The exemplary embodiment of the present disclosure does not limit the specific receiving detection method. But in a detection process, the receiver is required to use the spread sequences adopted by the multiple transmitters for identifying the signals transmitted by each terminal.

Figure 12:
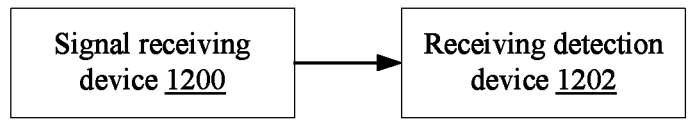
FIG. 12 is a module diagram of a receiver according to a fourth exemplary embodiment of the present disclosure.

Correspondingly, the receiver in a multiuser CDMA communication system in the embodiment, as shown in FIG. 12, may include a signal receiving device 1200 and a receiving detection device 1202.

The signal receiving device 1200 is arranged to receive signals transmitted by multiple transmitters. The signals transmitted by the multiple transmitters are formed by spreading respective modulated symbols to be transmitted by adopting respective spread sequences respectively and then modulating generated spread symbol sequences to a same time-frequency resource respectively by the K transmitters.

The receiving detection device 1202 is arranged to perform receiving detection on the received signals transmitted by the multiple transmitters by adopting an interference cancellation signal detector, and the spread sequences used by the multiple transmitters is used during detection.

The number of the spread sequences may be the same as the number of modulated symbols corresponding to a channel-coded code block, and the spread sequences are not completely the same.

During specific application, the solutions (the multiuser CDMA communication methods for the transmitter side and the receiver side and the corresponding transmitter and receiver) of the first exemplary embodiment and the second exemplary embodiment may be applied to an MC-CDMA system, and may be applied to a contention access scenario, a scheduling-free (or grant-free) access scenario and the like.

During application to the MC-CDMA system, the transmitter performs spreading processing on N modulated symbols corresponding to a code block to obtain a spread symbol sequence by adopting the N spread sequences which are not completely the same (that is, the number of the spread sequences is the same as the number of the modulated symbols corresponding to the channel-coded code block), and transmits the spread symbol sequence to the receiver. Multiple transmitters may use the same frequency-domain bandwidth or subcarrier resource. Correspondingly, after receiving signals transmitted by multiple transmitters, the receiver performs receiving detection on the signals transmitted by the multiple transmitters by adopting the interference cancellation signal detector. The receiver may effectively distinguish multiple terminals using the same time-frequency resource, thereby effectively improving system capacity, loading a larger terminal access number under a certain transmission rate condition, supporting a higher system overloading level and improving experiences of users in non-orthogonal overloaded access and communication.

During application to the contention access scenario, multiple and even a large number of user terminals may simultaneously request to access the system. Transmitters of each terminal perform spreading processing on data symbols to be transmitted by adopting the abovementioned specific spread sequences respectively. Then the receiver performs receiving detection on signals transmitted by the transmitters of each terminal by adopting the interference cancellation signal detector, and may effectively distinguish the signals transmitted by each terminal, thereby supporting a higher system overloading level, effectively system access efficiency and improving access experiences of the terminals.

During application to the scheduling-free (or grant-free) access scenario, a user terminal may perform data transmission on an available time-frequency resource when being required to transmit data, and there exists a condition that multiple user terminals perform data transmission by virtue of the same time-frequency resource. Transmitters of each terminal perform spreading processing on data symbols to be transmitted by adopting the abovementioned specific spread sequences respectively. Moreover, the receiver performs receiving detection on signals transmitted by the transmitters of each terminal by adopting the interference cancellation signal detector, and may effectively distinguish the signals transmitted by each terminal, thereby supporting a higher system overloading level, improving experiences of the user terminals in scheduling-free access and communication, reducing system scheduling signaling and reducing access delays of the terminals.

Fifth Exemplary Embodiment

The embodiment provides a method for generating N complex spread sequences with a length L. A transmitter generates a complex spread sequence with a length N×L at first according to two PN real sequences, values of all elements in the two PN real sequences are from the M-ary real number set mentioned in embodiment 3, and moreover, lengths of the two PN real sequences are the same as the length of the complex spread sequence. Finally, the complex sequence with the length N×L is equally divided into N segments to generate the N required complex spread sequences with the length L.

Figure 13:
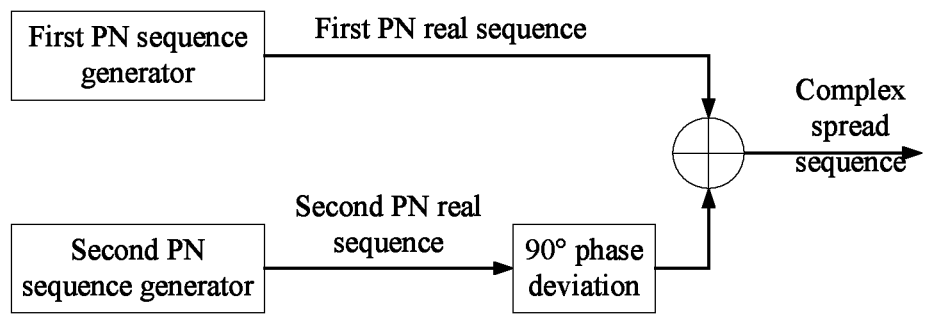
FIG. 13 is a principle diagram of an example of generation of complex spread sequences according to a fifth exemplary embodiment of the present disclosure.

In the exemplary embodiment of the present disclosure, the two PN real sequences are independently generated by two PN sequence generators in the transmitter respectively. As shown in FIG. 13, the first PN sequence generator generates a first PN real sequence with the length N×L, and the second PN sequence generator generates a second PN real sequence with the length N×L.

Figure 14:
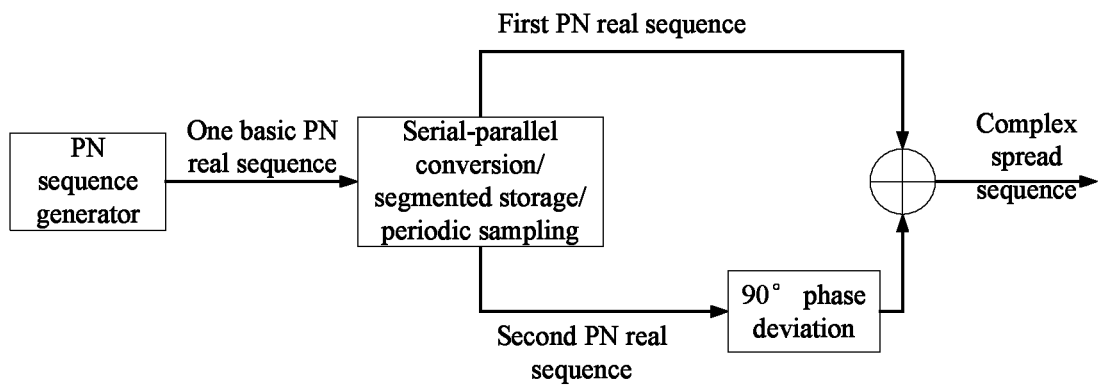
FIG. 14 is a principle diagram of another example of generation of complex spread sequences according to a fifth exemplary embodiment of the present disclosure.

In another embodiment, as shown in FIG. 14, a PN sequence generator in the transmitter generates one basic PN real sequence with a length 2×N×L at first, values of all elements in the basic real sequence being from the M-ary real number set mentioned in embodiment 3, and then serial-parallel conversion or segmented storage or periodic sampling is performed on the basic PN real sequence to form a first PN real sequence and second PN real sequence both with the length N×L.

If a serial-parallel conversion manner is adopted, it is supposed that the length of the basic PN real sequence is 2×N×L and initial values of element indexes of the basic real sequence are set to be 0. This is equivalent that the elements at even positions of the basic real sequence form the first PN real sequence, and the elements at odd positions of the basic real sequence form the second PN real sequence.

When a periodic sampling manner is adopted, if the length of the basic PN real sequence is many times of N×L, elements at a part of positions may be periodically extracted from the basic real sequence to form the first PN real sequence, and similarly, elements at the other part of positions may be periodically extracted to form the second PN real sequence.

In the embodiment, as shown in FIG. 13 and FIG. 14, after 90° phase deviation (or multiplication with $e^{j\pi/2}$), each element of the second PN real sequence is added with each element of the first PN real sequence bit by bit to generate the complex spread sequence, represented as:

$$\text{ComplexSeq} = \text{Seq1} + \text{Seq2} \times e^{j\pi/2},$$

where ComplexSeq represents the complex spread sequence, Seq1 represents the first PN real sequence, and Seq2 represents the second PN real sequence. Performing 90° phase deviation (or multiplication with $e^{j\pi/2}$) on each element of Seq2 is equivalent to determining Seq2 as an imaginary part of ComplexSeq. It should be noted that addition in the formula represents bit-by-bit addition, that is, an ith element of Seq1 is determined as a real part, an ith element of Seq2 is determined as an imaginary part, and a complex number including the real part and the imaginary part is determined as an ith element of ComplexSeq, i=1, 2, . . . , L.

For example, when M=3, that is, values of all the elements in the first PN real sequence and the second PN real sequence are from a three-element real number set {1,0,−1}, if the second PN real sequence is "−1, 0, 1, 1, −1, 1, −1, 0", 90° phase deviation is performed on each element therein, equivalent to multiplication with $e^{j\pi/2}$, to obtain "$e^{j\pi/2}$, $-e^{j\pi/2}$, 0, $-e^{j\pi/2}$, $e^{j\pi/2}$, 0, $-e^{j\pi/2}$, $e^{j\pi/2}$"; and if the first PN real sequence is "−1, 0, 1, 1, −1, 1, −1, 0", a complex sequence generated by bit-by-bit addition of the two is: "$-1+e^{j\pi/2}$, $-e^{j\pi/2}$, 1, $1-e^{j\pi/2}$, $-1+e^{j\pi/2}$, 1, $-1-e^{j\pi/2}$, $e^{j\pi/2}$", and the complex sequence may also be represented as: "−1+j, −j, 1, 1−j, −1+j, 1, −1−j, j". The complex sequence may be determined as the complex spread sequence. In addition, energy normalization may further be performed on the generated complex sequence, that is, each complex number in the complex sequence is multiplied by a corresponding energy normalization coefficient, and then an obtained complex sequence is determined as the complex spread sequence. The energy normalization coefficient corresponding to the complex sequence may adopt a reciprocal value of an energy sum of each element of the complex sequence, for example, the energy sum of the complex sequence "−1+j, −j, 1, 1−j, −1+j, 1, −1−j, j" is 2+1+1+2+2+1+2+1=12. Then, the complex sequence after energy normalization is: "(−1+j)/sqrt(12), −j/sqrt(12), 1/sqrt(12), (1−j)/sqrt(12), (−1+j)/sqrt(12), 1/sqrt(12), (−1−j)/sqrt(12), j/sqrt(12)", where sqrt( ) represents a square root extraction operation.

Phase deviation may also adopt another value between 0 and $2\pi$, such as 270° (or $3\pi/2$), −90° (or $-\pi/2$), −270° (or $-3\pi/2$).

Figure 15:
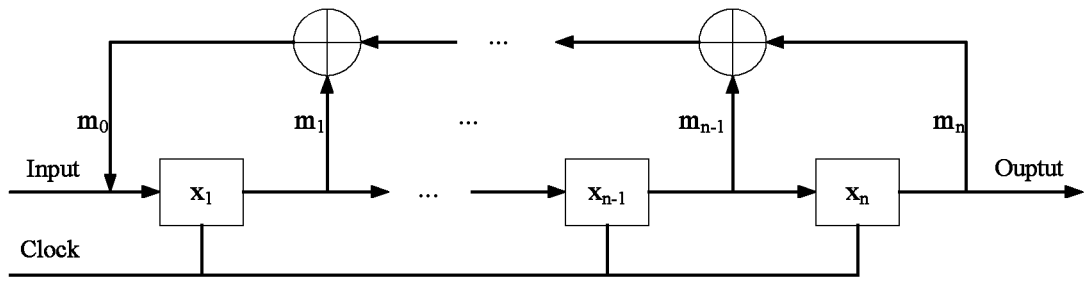
FIG. 15 is a principle diagram of an M-ary PN sequence generator according to a fifth exemplary embodiment of the present disclosure.

The PN sequence generator may be formed by linear feedback shift registers. As shown in FIG. 15, it is supposed that the PN sequence generator is formed by n stages of linear feedback shift registers, and is arranged to generate a PN real sequence with a length $M^n-1$, and a feedback function or a feedback connection polynomial may be represented as $f=m_0x_0+m_1x_1+ \ldots +m_{n-1}x_{n-1}+m_nx_n$, where $(m_0, m_1, \ldots m_{n-1}, m_n)$ is a feedback coefficient; and a clock is arranged to control a shift registering operation. For the two PN sequence generators in FIG. 13, the two may adopt the same or different feedback functions or feedback connection polynomials.

Sixth Exemplary Embodiment

Figure 16:
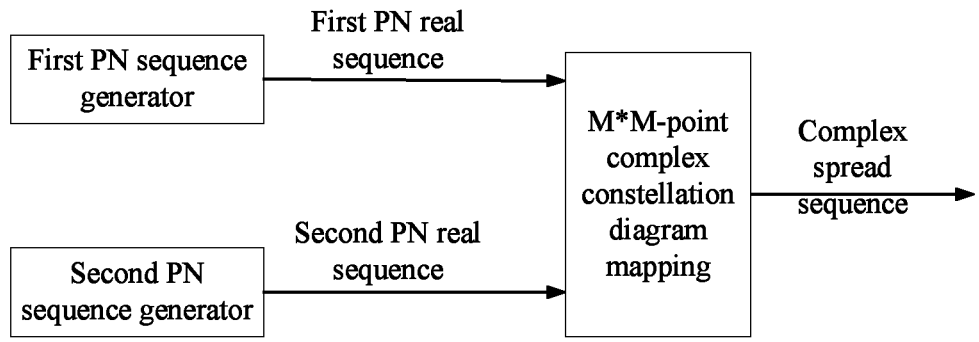
FIG. 16 is a principle diagram of an example of generation of complex spread sequences according to a sixth exemplary embodiment of the present disclosure.
Figure 17:
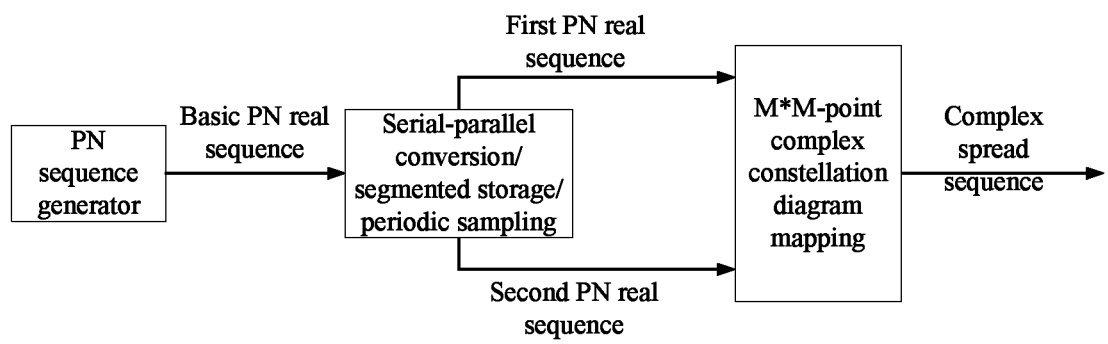
FIG. 17 is a principle diagram of another example of generation of complex spread sequences according to a sixth exemplary embodiment of the present disclosure.

A sixth exemplary embodiment of the present disclosure provides a method for generating N complex spread sequences with a length L. A principle of the method is shown in FIG. 16 or FIG. 17. A transmitter generates a complex spread sequence with a length N×L according to two PN real sequences with the length N×L, and finally equally divides the complex sequence with the length N×L into N segments to generate the N required complex spread sequences with the length L. Moreover, a generation process for the two PN real sequences is mentioned in embodiment 5.

Figure 18:
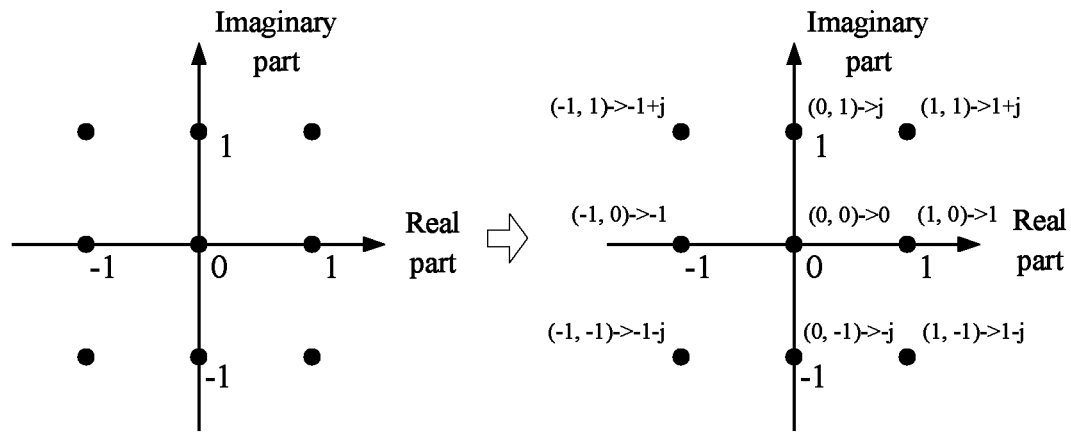
FIG. 18 is a schematic diagram of a mapping relationship between two PN real sequences adopting values in a three-element real number set and a complex constellation diagram according to a sixth exemplary embodiment of the present disclosure.
Figure 19:
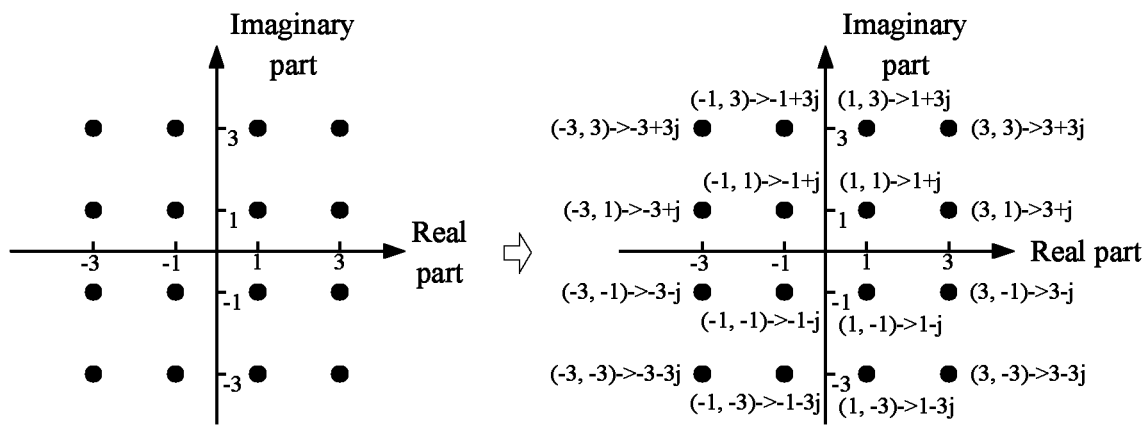
FIG. 19 is a schematic diagram of a mapping relationship between two PN real sequences adopting values in a four-element real number set and a complex constellation diagram according to a sixth exemplary embodiment of the present disclosure.

In the embodiment, as shown in FIG. 18 and FIG. 19, a first PN real sequence and a second PN real sequence are mapped to a complex constellation diagram bit by bit together to generate the complex spread sequence according to a mapping relationship between the two PN real sequences with the length N×L and the complex constellation diagram, represented by the following formula:

(Seq1*i*,Seq2*i*)->ComplexSeq*i* where ComplexSeqi represents an ith element of the complex spread sequence, and is obtained by (Seq1i, Seq2i) mapping according to the mapping relationship between the PN real sequences and the complex constellation diagram, Seq1i represents an ith element of the first PN real sequence and Seq2i represents an ith element of the second PN real sequence.

For example, when M=3, that is, values of all elements in the first PN real sequence and the second PN real sequence are from a three-element real number set {1,0,−1}, for the two PN real sequences, it is predefined that the complex constellation diagram may include 9 constellation points formed by 9 complex coordinates 1+j, j, −1+j, 1, 0, −1, 1−j, −j, −1−j, and it is also predefined that (Seq1i, Seq2i) is mapped to be a complex number 1+j when being valued to be (1,1), is mapped to be a complex number j when being valued to be (0,1), is mapped to be a complex number −1+j when being valued to be (−1,1), is mapped to be a complex number 1 when being valued to be (1,0), is mapped to be a complex number 0 when being valued to be (0,0), is mapped to be a complex number −1 when being valued to be (−1,0), is mapped to be a complex number 1−j when being valued to be (1,−1), is mapped to be a complex number −j when being valued to be (0,−1) and is mapped to be a complex number −1−j when being valued to be (−1,−1), as shown in FIG. 13.

In the exemplary embodiment of the present disclosure, if the first PN real sequence is "−1, 0, 1, 1, −1, 1, −1, 0" and the second PN real sequence is "1, −1, 0, −1, 1, 0, −1, 1", the first PN real sequence and the second PN real sequence are mapped bit by bit together to the complex constellation points on the 9-point complex constellation diagram to obtain a complex sequence: "−1+j, −j, 1, 1−j, −1+j, 1, −1−j, j" according to the mapping relationship between the two PN real sequences and the 9-point complex constellation diagram, and the sequence may be determined as the generated complex spread sequence. In addition, energy normalization may further be performed on the complex spread sequence to obtain the complex spread sequence. Here, during energy normalization, an adopted energy normalization coefficient may also be a reciprocal value of an energy sum of the 9 complex constellation points on the complex constellation diagram.

For example, when M=4, that is, the values of all the elements in the first PN real sequence and the second PN real sequence are from a four-element real number set {3,1,−1,−3}, for the two PN real sequences, it is predefined that the complex constellation diagram may include 16 constellation points formed by 16 complex coordinates 3+3j, 3+j, 3−j, 3−3j, 1+3j, 1+j, 1−j, 1−3j, −1+3j, −1+j, −1−j, −1−3j, −3+3j, −3+j, −3−j, −3−3j, and it is also predefined that (Seq1i, Seq2i) is mapped to be a complex number 3+3j when being valued to be (3,3), is mapped to be a complex number 3+j when being valued to be (3,1), is mapped to be a complex number 3−j when being valued to be (3,−1), is mapped to be a complex number 3−3j when being valued to be (3,−3), is mapped to be a complex number 1+j when being valued to be (1,1), is mapped to be a complex number 1−j when being valued to be (1,−1), is mapped to be a complex number 1−3j when being valued to be (1,−3), is mapped to be a complex number −1+3j when being valued to be (−1,3), is mapped to be a complex number −1+j when being valued to be (−1,1), is mapped to be a complex number −1−j when being valued to be (−1,−1), is mapped to be a complex number −1−3j when being valued to be (−1,−3), is mapped to be a complex number −3+3j when being valued to be (−3,3), is mapped to be a complex number −3+j when being valued to be (−3,1), is mapped to be a complex number −3−j when being valued to be (−3,−1) and is mapped to be a complex number −3−3j when being valued to be (−3,−3), as shown in FIG. 14.

In the exemplary embodiment of the present disclosure, if the first PN real sequence is "−1, 3, 1, −3, 1, 3, −1, −3" and the second PN real sequence is "3, 1, −3, −1, 1, −1, −3, 3", the first PN real sequence and the second PN real sequence are mapped bit by bit together to the complex constellation points on the 16-point complex constellation diagram to obtain a complex sequence: "−1+3j, 3+j, 1−3j, −3−j, 1+j, 3−j, −1−3j, −3−3j" according to the mapping relationship between the two PN real sequences and the 16-point complex constellation diagram, and the sequence may be determined as the generated complex spread sequence. In addition, energy normalization may further be performed on the complex spread sequence to obtain the complex spread sequence.

For the mapping relationship between the two PN real sequences and the 16-point complex constellation diagram, each value set of the elements of the two PN real sequences may also be numbered by binary indexes, for example, (1,1) is represented as 0000, (−1,1) is represented as 0001, . . . , and (3,−3) is represented as 1111. Similarly, the 16 complex constellation points of the 16-point complex constellation diagram are also numbered according to the same rule, for example, 1+j is represented as 0000, −1+j is represented as 0001, . . . , 3−3j is represented as 1111. That is, each value set of the elements of the two four-element PN sequences forms a one-to-one corresponding relationship with the 16 complex constellation points. Then, the two generated PN real sequences may be mapped bit by bit together to the 16 constellation points on the complex constellation diagram to obtain the complex sequence according to the mapping relationship, and the complex sequence is determined as the complex spread sequence, or, energy normalization is performed on the complex sequence to obtain the complex spread sequence.

Besides abovementioned mapping over the two PN real sequences when M=4 and the 16-point complex constellation diagram, two PN real sequences generated when M=2 and the 16-point complex constellation diagram may also be mapped. Since values of elements of the PN real sequences when M=2 are 0 or 1, or, 1 or −1, it is required to utilize two elements in the real sequences for mapping. For example, if the first PN real sequence is "01100011" and the second PN real sequence is "10111010" when M=2, two elements are sequentially extracted from the first PN real sequence and the second PN real sequence at the same time for mapping, and then (01,10) is mapped to be a complex constellation point represented by 0110 on the 16-point complex constellation diagram, (10,11) is mapped to be a complex constellation point represented by 1011 on the 16-point complex constellation diagram, and the like.

The complex constellation diagram and the mapping relationship between the two PN real sequences and the complex constellation diagram may also be defined into another form, and a complex constellation diagram formed by more complex constellation points and a mapping relationship between more than two PN real sequences and the complex constellation diagram may further be defined, which is similar to the abovementioned principle and will not be elaborated.

Seventh Exemplary Embodiment

Figure 20:
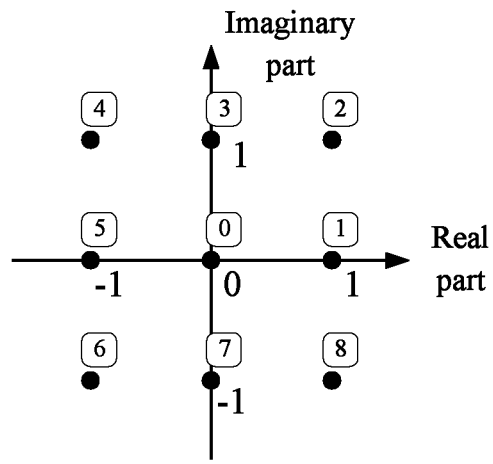
FIG. 20 is a principle diagram of an example of generation of complex spread sequences according to a seventh exemplary embodiment of the present disclosure.
Figure 21:
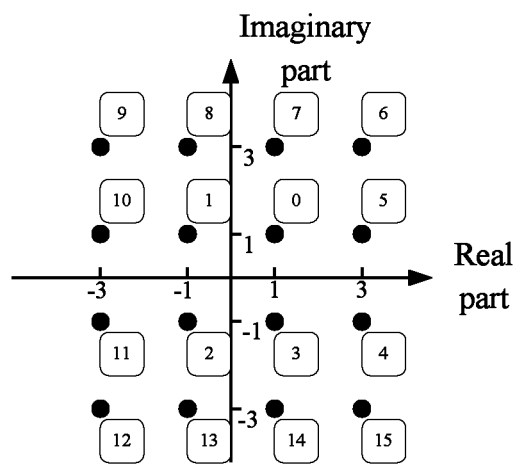
FIG. 21 is a principle diagram of another example of generation of complex spread sequences according to a seventh exemplary embodiment of the present disclosure.

The exemplary embodiment of the present disclosure provides a method for generating N complex spread sequences with a length L. A principle of the method is shown in FIG. 20 or FIG. 21.

A transmitter generates a PN integer sequence with a length N×L at first, the integer sequence has N×L elements, values of all the elements are from an M×M (M multiplied by M)-element integer set, and the M×M-ary integer set is a set formed by all integers within a range [0, M×M−1] or [1, M×M], where M and L are both integers more than or equal to 2.

N×L corresponding constellation points are selected from a complex constellation diagram including M×M points according to a preset mapping rule, thereby forming a complex sequence with the length N×L, and finally, the complex sequence with the length N×L is equally divided into N segments to generate the N required complex spread sequences with the length L. Or, the N groups of L complex sequences are multiplied by a corresponding energy normalization coefficient to sequentially form the N complex spread sequences with the length L.

Here, the complex spread sequences are the same as those in embodiment 3. Each element is a complex number, and values of real parts and imaginary parts of all the elements in the complex spread sequences are from an M-ary real number set.

The PN integer sequence may be generated by a PN sequence generator, and the PN sequence generator may be formed by linear feedback shift registers, as mentioned in embodiment 5.

In the embodiment, for example, in case of an M×M=9-element integer set, the transmitter generates a PN integer sequence, values of elements of the integer sequence being all from the 9-element integer set {0, 1, 2, . . . , 8}, and maps the PN integer sequence to complex constellation points (each complex constellation point represents a complex number) of a 9-point complex constellation diagram bit by bit to generate a complex spread sequence according to a mapping relationship (as shown in FIG. 20) between the elements in the 9-element integer set and the complex constellation points of the M×M=9-point complex constellation diagram, represented by the following formula:

$$Seq_i \rightarrow ComplexSeq_i$$

where $ComplexSeq_i$ represents an ith element of the complex spread sequence, and is obtained by $Seq_i$ mapping according to the mapping relationship between the elements in the 9-element integer set and the complex constellation points of the 9-point complex constellation diagram, and $Seq_i$ represents an ith element of the PN integer sequence.

In another embodiment, for example, in case of an M×M=1-element integer set, the transmitter generates a PN integer sequence, values of elements of the integer sequence being all from the 16-element integer set {0, 1, 2, . . . , 15}, and maps the PN integer sequence to complex constellation points of a 16-point complex constellation diagram bit by bit to generate a complex spread sequence according to a mapping relationship (as shown in FIG. 21) between the elements in the 16-element integer set and the complex constellation points of the M×M=16-point complex constellation diagram, represented by the following formula:

$$Seq_i \rightarrow ComplexSeq_i$$

where $ComplexSeq_i$ represents an ith value of the complex spread sequence, and is obtained by $Seq_i$ mapping according to the mapping relationship between the elements in the 16-element integer set and the complex constellation points of the 16-point complex constellation diagram, and $Seq_i$ represents an ith element of the PN integer sequence.

The M×M-ary integer set, the M×M-point complex constellation diagram and the mapping relationship between the two may also be defined into another form, which is similar to the abovementioned principle and will not be elaborated.

Eighth Exemplary Embodiment

The embodiment of the present disclosure provides a method for generating N spread sequences with a length L, as mentioned below.

The N spread sequences which are not completely the same may also be formed by selecting, according to a specified PN criterion, for N times from a table which is determined by the receiver and the transmitter and formed by a plurality of sequences with the length L.

For example, a transmitter of a terminal performs selection for N times from a sequence set to generate the N spread sequences with the length L according to randomly generated indexes or indexes calculated according to a predefined formula, or, a base station notifies the transmitter of the terminal of a spread sequence selection method through signaling, and the transmitter of the terminal acquires sequences as the spread sequences from the sequence set or a sequence table according to the selection method.

In the embodiment, it is supposed that Table 1 is a complex sequence set predefined by a system, the complex sequence set may include n complex sequences, and a length of each sequence is L.

TABLE 1

| Index | 0 | 1 | ... | L − 1 |
|---|---|---|---|---|
| 0 | 1 + j | 0 | ... | −1 − j |
| 1 | −j | 1 | ... | −1 + j |
| ... | ... | ... | ... | ... |
| n − 1 | 1 − j | −1 + j | ... | 0 |

The complex sequence set or the complex sequence table may also be defined into another form, which is similar to the abovementioned principle and will not be elaborated.

The transmitter of the terminal performs selection according to N randomly generated PN integers between 0 and n−1 as table indexes, and for example, if a first generated index is 1, a complex sequence with the index 1 is selected from Table 1 as a spread sequence of a first modulated symbol; or, the transmitter of the terminal performs selection according to the indexes calculated according to the predefined formula, and for example, if the first calculated index is 1, the complex sequence with the index 1 is selected from Table 1 as the spread sequence of the first modulated symbol.

In another implementation mode, the base station notifies the transmitter of the terminal of a complex spread sequence index generation method through signaling. For example, the first index generated by the index generation method notified by the base station through the signaling is 1, and the transmitter of the terminal selects the complex sequence with the index 1 from Table 1 as the spread sequence of the first modulated symbol according to the index.

Alternatively, all or part of the acts of the abovementioned embodiments may also be implemented by virtue of an integrated circuit, and these acts may form multiple integrated circuit modules respectively, or multiple modules or acts therein form a single integrated circuit module for implementation. Therefore, the present disclosure is not limited to any specific hardware and software combination.

In another embodiment, software is further provided, which is arranged to execute the technical solutions described in the abovementioned embodiments and exemplary implementation modes.

In another embodiment, a storage medium is further provided, in which the abovementioned software is stored, the storage medium including, but not limited to: an optical disk, a floppy disk, a hard disk, an erasable memory and the like.

It may be appreciated that terms "first", "second" and the like in the specification, claims and drawings of the present disclosure are adopted not to describe a specific sequence or order but to distinguish similar objects. It should be understood that the objects used like this may be exchanged under a proper condition to facilitate implementation of the embodiments, described here, of the present disclosure in another sequence besides those shown or described here. In addition, terms "include" and "have" and any transformation thereof are intended to cover nonexclusive inclusions. For example, a process, method, system, product or equipment including a series of acts or units is not limited to the acts or units which are clearly listed, but may include other acts or units which are not clearly listed or intrinsic to the process, the method, the product or the equipment.

From the above, the embodiments of the present disclosure achieve the following technical effects: the problem that interference between users may not be effectively randomized or averaged because one user spreads all modulated symbols by virtue of one and the same spread sequence in the communication technology is solved. Each access user may spread modulated symbols by virtue of multiple different spread sequences to effectively randomize or average the interference between the users, and multiple access performance is improved.

Obviously, those skilled in the art should know that each module or each act of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

INDUSTRIAL APPLICABILITY

The technical solutions provided by the present disclosure may be applied to a multiuser communication process for CDMA. The technical solution of spreading the modulated symbols by virtue of the N spread sequences including at least two different spread sequences is adopted, so that the problem that interference between users may not be effectively randomized or averaged because one user spreads all modulated symbols by virtue of one and the same spread sequence in the communication technology is solved. Multiple access performance is improved, and each access user may spread modulated symbols by virtue of multiple different spread sequences to effectively randomize or average the interference between the users.

What is claimed is:
1. A multiuser communication method for Code Division Multiple Access (CDMA), applied to a transmitter, the method comprising:
acquiring N modulated symbols which are obtained by modulating a code block coded by a channel coder, where N is a positive integer more than or equal to 2;

spreading the N modulated symbols according to N spread sequences with a specified length, wherein there are at least two different spread sequences in the N spread sequences with the specified length, the N spread sequences comprise: complex sequences; and transmitting the spread modulated symbols;

wherein the complex sequences are determined in the following manner:

generating a first real sequence with a length R according to a first Pseudo-Noise (PN) sequence generator, and generating a second real sequence with the length R according to a second PN sequence generator, where R=N×L, and L is a value of the specified length;

determining an ith element of the first real sequence as a real part of a complex sequence, determining an ith element of the second real sequence as an imaginary part of the complex sequence, and determining a complex number comprising the real part and the imaginary part as an ith complex element of the complex sequence, where i=1,2,3 . . . , R;

and sequentially arranging R obtained complex elements to form the complex sequence with the length R, and equally dividing the complex sequence with the length R into N complex sequences with the specified length.

2. The method as claimed in claim 1, wherein the spread sequences further comprise: real sequences.

3. The method as claimed in claim 1, wherein after equally dividing the complex sequence with the length R into the N complex sequences with the specified length, the method further comprises:

multiplying the N complex sequences with the specified length by an energy normalization coefficient of the N complex sequences with the specified length to obtain N normalized complex sequences with the specified length respectively.

4. The method as claimed in claim 1, wherein transmitting the spread modulated symbols comprises:

performing multi-carrier modulation on the modulated symbols; and determining the modulated symbols obtained by modulation as a transmitting signal of the transmitter.

5. A multiuser communication method for Code Division Multiple Access (CDMA), applied to a receiver and comprising:

receiving transmitting signals which are transmitted by K transmitters through a method as claimed in claim 4, wherein the transmitting signals are signals formed by spreading modulated signals by adopting spread sequences with the specified length respectively and then modulating the spread modulated signals to a same time-frequency resource respectively by the K transmitters and for each transmitter, there exist N spread sequences with the specified length for N modulated symbols and there are at least two different spread sequences in the N spread sequences with the specified length, both N and K being positive integers; and detecting the transmitting signals according to the spread sequences.

6. A multiuser communication device for Code Division Multiple Access (CDMA), applied to a transmitter and comprising a hardware processor arranged to execute program modules comprising:

a first acquisition module, arranged to acquire N modulated symbols which are obtained by modulating a code block coded by a channel coder, where N is a positive integer more than or equal to 2;

a spreading module, arranged to spread the N modulated symbols according to N spread sequences with a specified length, wherein there are at least two different spread sequences in the N spread sequences with the specified length, the N spread sequences comprise: complex sequences; and a transmitting module, arranged to transmit the spread modulated symbols;

wherein the hardware processor is arranged to execute program modules further comprising:

a generation module, arranged to generate a first real sequence with a length R according to a first Pseudo-Noise (PN) sequence generator, and generate a second real sequence with the length R according to a second PN sequence generator, where R=N×L, and L is a value of the specified length;

a determination module, arranged to determine an ith element of the first real sequence as a real part of a complex sequence, determine an ith element of the second real sequence as an imaginary part of the complex sequence, and determine a complex number comprising the real part and the imaginary part as an ith complex element of the complex sequence, where i=1,2,3 . . . , R; and a forming module, arranged to sequentially arrange R obtained complex elements to form the complex sequence with the length R, and equally divide the complex sequence with the length R into N complex sequences with the specified length.

7. The device as claimed in claim 6, wherein the hardware processor is arranged to execute program modules further comprising:

an other determination module, arranged to determine the N spread sequences with the specified length according to output sequences of a PN sequence generator; and a second acquisition module, arranged to acquire the N spread sequences with the specified length from a preset table according to a preset criterion, wherein the preset table comprises multiple sequences with the specified length.

8. The device as claimed in claim 6, wherein the generation module is further arranged to generate an integer sequence with the length R according to a PN sequence generator, wherein elements of the integer sequence are from an integer set {0, 1, . . . , D} or a set {1, 2, . . . , D}, R=N×L, Lisa value of the specified length, and D is a number of constellation points in a complex constellation diagram;

and the hardware processor is arranged to execute program modules further comprising:

a selection module is arranged to select, from the complex constellation diagram, constellation points corresponding to the elements of the integer sequence with the length R according to a preset mapping rule; and a third determination module is arranged to determine the complex sequences according to the constellation points.

9. The device as claimed in claim 8, wherein the selection module is arranged to generate real parts and imaginary parts of all the complex elements in the complex sequences by virtue of a PN sequence generator generating M-ary real numbers, or select real parts and imaginary parts of all complex elements in the complex sequences from an M-ary real number set according to a specified PN criterion, where M is an integer more than or equal to 2; and the third determination module is arranged to determine the complex sequences according to the selected real parts and imaginary parts of all the complex elements.

10. A multiuser communication device for Code Division Multiple Access (CDMA), applied to a receiver and comprising a hardware processor arranged to execute program modules comprising:
   a receiving module, arranged to receive transmitting signals transmitted by K transmitters as claimed in claim 6, wherein the transmitting signals are signals formed by spreading modulated signals by adopting spread sequences with the specified length respectively and then modulating the spread modulated signals to a same time-frequency resource respectively by the K transmitters and for each transmitter, there exist N spread sequences with the specified length for N modulated symbols and there are at least two different spread sequences in the N spread sequences with the specified length, both N and K being positive integers; and
   a detection module, arranged to detect the transmitting signals according to the spread sequences.

11. A multiuser communication method for Code Division Multiple Access (CDMA), applied to a transmitter, the method comprising:
   acquiring N modulated symbols which are obtained by modulating a code block coded by a channel coder, where N is a positive integer more than or equal to 2;
   spreading the N modulated symbols according to N spread sequences with a specified length, wherein there are at least two different spread sequences in the N spread sequences with the specified length, wherein the N spread sequences comprise: complex sequences; and
   transmitting the spread modulated symbols;
   wherein the complex sequences are determined in the following manner:
   generating an integer sequence with a length R according to a Pseudo-Noise (PN) sequence generator, wherein elements of the integer sequence are from an integer set $\{0,1, \ldots, D\}$ or a set $\{1,2, \ldots, D\}$, $R=N \times L$, L is a value of the specified length, and D is a number of constellation points in a complex constellation diagram;
   selecting, from the complex constellation diagram, constellation points corresponding to the elements of the integer sequence with the length R according to a preset mapping rule; and
   determining the complex sequences according to the constellation points.

12. The method as claimed in claim 11, wherein transmitting the spread modudlated symbols comprises:
   performing multi-carrier modulation on the modulated symbols; and
   determining the modulated symbols obtained by modulation as a transmitting signal of the transmitter.

13. A multiuser communication method for Code Division Multiple Access (CDMA), applied to a transmitter, the method comprising:
   acquiring N modulated symbols which are obtained by modulating a code block coded by a channel coder, where N is a positive integer more than or equal to 2;
   spreading the N modulated symbols according to N spread sequences with a specified length, wherein there are at least two different spread sequences in the N spread sequences with the specified length, wherein the N spread sequences comprise: complex sequences; and
   transmitting the spread modulated symbols;
   wherein the complex sequences are determined in the following manner: generating real parts and imaginary parts of all complex elements in the complex sequences by virtue of a Pseudo-Noise (PN) sequence generator generating M-ary real numbers, or selecting real parts and imaginary parts of all complex elements in the complex sequences from an M-ary real number set according to a specified PN criterion, where M is an integer more than or equal to 2; and determining the complex sequences according to the selected real parts and imaginary parts of all the complex elements;
   wherein the complex sequences are further determined in the following manner:
   generating a first real sequence with a length R and a second real sequence with the length R according to the M-ary real number set, wherein both the first real sequence and the second real sequence adopt values in the M-ary real number set, where $R=N \times L$, and L is a value of the specified length; determining an ith element of the first real sequence as a real part of a complex sequence, determining an ith element of the second real sequence as an imaginary part of the complex sequence, and determining a complex number comprising the real part and the imaginary part as an ith complex element of the complex sequence, where $i=1,2,3 \ldots, R$; and sequentially arranging R obtained elements to form the complex sequence with the length R, and equally dividing the complex sequence with the length R into N complex sequences with the specified length.

14. The method as claimed in claim 13, wherein the M-ary real number set meets at least one of the following conditions:
   when M is an odd number, the M-ary real number set is a set formed by M integers within a range $[-(M-1)/2, (M-1)/2]$;
   when M is an even number, the M-ary real number set is a set formed by M odd numbers within a range $[-(M-1), (M-1)]$;
   when M is an odd number, the M-ary real number set is a set formed by M real numbers obtained by multiplying M integers within the range $[-(M-1)/2, (M-1)/2]$ by an energy normalization coefficient corresponding to the M-ary real number set respectively; and
   when M is an even number, the M-ary real number set is a set formed by M real numbers obtained by multiplying M odd numbers within the range $[-(M-1), (M-1)]$ by an energy normalization coefficient corresponding to the M-ary real number set respectively.

15. The method as claimed in claim 13, wherein after the complex sequence with the length R is equally divided into the N complex sequences with the specified length, the method further comprises:
   multiplying the N complex sequences with the specified length by an energy normalization coefficient of the N complex sequences with the specified length to obtain N normalized complex sequences with the specified length respectively.

16. The method as claimed in claim 13, wherein a value of M comprises at least one of: 2, 3 or 4.

17. The method as claimed in claim 13, wherein transmitting the spread modulated symbols comprises:
   performing multi-carrier modulation on the modulated symbols; and
   determining the modulated symbols obtained by modulation as a transmitting signal of the transmitter.

18. A multiuser communication method for Code Division Multiple Access (CDMA), applied to a transmitter, the method comprising:
- acquiring N modulated symbols which are obtained by modulating a code block coded by a channel coder, where N is a positive integer more than or equal to 2;
- spreading the N modulated symbols according to N spread sequences with a specified length, wherein there are at least two different spread sequences in the N spread sequences with the specified length, wherein the N spread sequences comprise: complex sequences; and
- transmitting the spread modulated symbols;
- wherein the complex sequences are determined in the following manner: generating real parts and imaginary parts of all complex elements in the complex sequences by virtue of a Pseudo-Noise (PN) sequence generator generating M-ary real numbers, or selecting real parts and imaginary parts of all complex elements in the complex sequences from an M-ary real number set according to a specified PN criterion, where M is an integer more than or equal to 2; and determining the complex sequences according to the selected real parts and imaginary parts of all the complex elements;
- wherein the complex sequences are further determined in the following manner:
- generating an integer sequence with a length R, wherein values of the integer sequence are from an M×M-ary integer set, and the M×M-ary integer set is a set formed by all integers within a range [0, M×M−1] or [1, M×M];
- selecting, from the complex constellation diagram, constellation points corresponding to elements of the integer sequence with the length R according to a preset mapping rule; and
- determining the complex sequences according to the constellation points.

19. The method as claimed in claim 18, wherein the M-ary real number set meets at least one of the following conditions:
- when M is an odd number, the M-ary real number set is a set formed by M integers within a range [−(M−1)/2, (M−1)/2];
- when M is an even number, the M-ary real number set is a set formed by M odd numbers within a range [−(M−1), (M−1)];
- when M is an odd number, the M-ary real number set is a set formed by M real numbers obtained by multiplying M integers within the range [−(M−1)/2, (M−1)/2] by an energy normalization coefficient corresponding to the M-ary real number set respectively; and
- when M is an even number, the M-ary real number set is a set formed by M real numbers obtained by multiplying M odd numbers within the range [−(M−1), (M−1)] by an energy normalization coefficient corresponding to the M-ary real number set respectively.

20. The method as claimed in claim 18, wherein a value of M comprises at least one of: 2, 3 or 4.

21. The method as claimed in claim 18, wherein transmitting the spread modulated symbols comprises:
- performing multi-carrier modulation on the modulated symbols; and
- determining the modulated symbols obtained by modulation as a transmitting signal of the transmitter.

* * * * *